(12) United States Patent
Jessup et al.

(10) Patent No.: US 7,539,882 B2
(45) Date of Patent: May 26, 2009

(54) SELF-POWERED DEVICES AND METHODS

(75) Inventors: Holden D. Jessup, Palo Alto, CA (US);
Daylyn M. Meade, Sebastopol, CA (US); Timothy P. Flood, Sebastopol, CA (US); Clive A. Hallatt, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 234 days.

(21) Appl. No.: 11/443,668

(22) Filed: May 30, 2006

(65) Prior Publication Data

US 2006/0271678 A1 Nov. 30, 2006

Related U.S. Application Data

(60) Provisional application No. 60/685,976, filed on May 30, 2005.

(51) Int. Cl.
*G06F 1/26* (2006.01)
(52) U.S. Cl. .......... 713/300; 700/286
(58) Field of Classification Search .......... 700/297, 700/291, 286, 295; 709/224; 310/303; 136/249, 136/253; 713/300, 320, 303, 302; 326/30
See application file for complete search history.

(56) References Cited

U.S. PATENT DOCUMENTS

| | | | | |
|---|---|---|---|---|
| 5,642,014 A | * | 6/1997 | Hillenius | 310/303 |
| 6,493,944 B2 | * | 12/2002 | Jarzombek | 30/275.4 |
| 6,693,438 B2 | * | 2/2004 | Shea | 324/555 |
| 6,693,585 B1 | * | 2/2004 | MacLeod | 342/357.07 |
| 6,701,443 B1 | * | 3/2004 | Bell | 713/300 |
| 7,168,180 B2 | * | 1/2007 | Wu et al. | 33/642 |
| 7,278,705 B2 | * | 10/2007 | Ohara | 347/23 |
| 7,281,144 B2 | * | 10/2007 | Banginwar et al. | 713/320 |
| 7,302,600 B2 | * | 11/2007 | Bibikar et al. | 713/324 |
| 7,334,142 B2 | * | 2/2008 | Hack | 713/320 |
| 2002/0181700 A1 | * | 12/2002 | Unno | 379/413 |
| 2004/0246821 A1 | * | 12/2004 | Fujisawa | 368/204 |
| 2004/0249571 A1 | * | 12/2004 | Blesener et al. | 701/301 |
| 2005/0087019 A1 | * | 4/2005 | Face | 73/649 |
| 2005/0166074 A1 | * | 7/2005 | Hack | 713/320 |

* cited by examiner

*Primary Examiner*—Kidest Bahta
(74) *Attorney, Agent, or Firm*—Morgan, Lewis & Bockius LLP

(57) ABSTRACT

A system includes a computing device that selectively communicates with a self-powered device. The self-powered device has several modes of operation, including a first low-power mode of operation and a second high-power mode of operation. The self-powered device is to communicate with the computing device when the self-powered device is in the second mode of operation. The self-powered device may conserve power by alternating between the first mode of operation and the second mode of operation such that the self-powered device is in the second mode of operation during pre-determined or adaptively-determined time intervals. A duty-cycle of the second mode of operation relative to the first mode of operation may be in accordance with a power budget for the self-powered device.

26 Claims, 12 Drawing Sheets

SELF-POWERED DEVICES AND METHODS

CROSS REFERENCE TO RELATED APPLICATION(S)

This application claims priority to U.S. Provisional Application No. 60/685,976, filed May 30, 2005, which is incorporated herein by reference in its entirety.

TECHNICAL FIELD

The embodiments disclosed herein relate to self-powered electronic devices, and in particular to self-powered electronic devices that include power saving features.

BACKGROUND

Private and public networks, such as the Internet, continue to grow at an exponential rate. These rapidly expanding networks consume a tremendous amount of power, which is typically supplied from traditional electrical power grids. As such, most networked computers are either tethered to electrical wall outlets, or require periodic charging at electrical wall outlets. Many networked computers, however, have benefited tremendously by being self-powered. For example, emergency communication systems, computing devices in rural areas where access to traditional power sources is limited, etc.

However, current self-powered devices, such as devices that obtain energy from solar power, typically waste much of their power communicating with other networked computing devices. As such, it would be highly desirable to provide a self-powered device ("SPD") that consumes less power when communicating with other devices in a network.

BRIEF DESCRIPTION OF THE DRAWINGS

For a better understanding of the disclosure herein, reference should be made to the following detailed description taken in conjunction with the accompanying drawings, in which.

Like reference numerals refer to the same or similar components throughout the several views of the drawings.

DETAILED DESCRIPTION OF THE EMBODIMENTS

Figure 10:
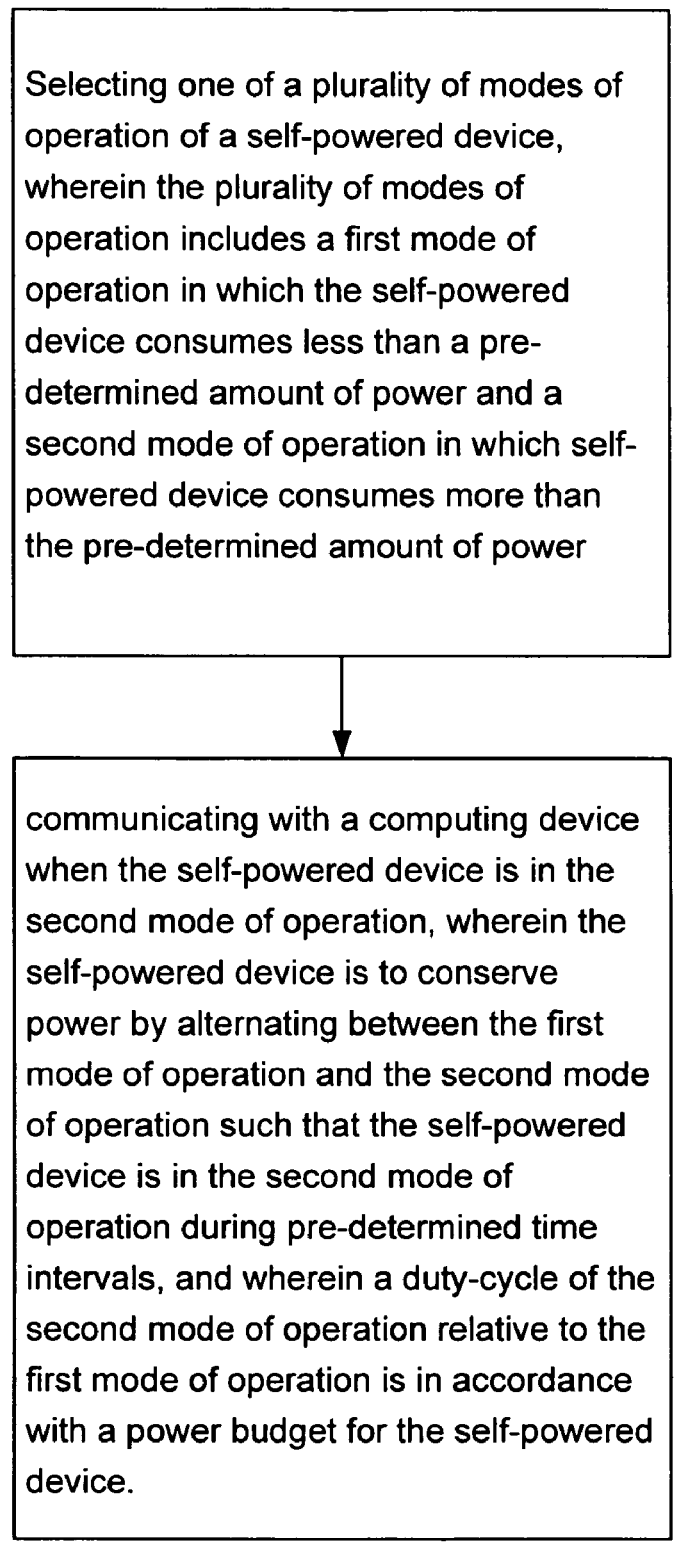
FIG. 10 is a flow chart of a method for managing power consumption.

Embodiments of self-powered systems, devices, and methods are described herein. The self-powered system may include a computing device that selectively communicates with a self-powered device. The self-powered device may include: a circuit to power the self-powered device; memory; a processor; and a program mechanism that is stored in the memory for execution by the processor. The program mechanism may include instructions for selecting one of a plurality of modes of operation, including a first mode of operation in which the self-powered device consumes less than a pre-determined amount of power, and a second mode of operation in which self-powered device consumes more than the pre-determined amount of power. (See FIG. 10).

The program mechanism may further include instructions for communicating with the computing device when the self-powered device is in the second mode of operation. The self-powered device may conserve power by alternating between the first mode of operation and the second mode of operation such that the self-powered device is in the second mode of operation during pre-determined or adaptively-determined time intervals. A duty-cycle of the second mode of operation relative to the first mode of operation may be based on a power budget for the self-powered device.

The computing device and the self-powered device may be synchronized such that transmit circuits and receive circuits in the computing device and the self-powered device are to communicate signals during one or more of the pre-determined or adaptively-determined time intervals. Also in some embodiments, the synchronization includes use of a Network Time Protocol. In some embodiments, the synchronization includes a Wi-Fi periodic beacon signal.

The computing device may poll the self-powered device during one or more of the pre-determined or adaptively-determined time intervals.

The self-powered device may switch to the second mode of operation prior to one or more of the pre-determined or adaptively-determined time intervals, and the self-powered device may switch to the first mode of operation after one or more of the pre-determined or adaptively-determined time intervals.

In some embodiments, the self-powered device further includes instructions for determining a periodicity of the pre-determined or adaptively-determined time intervals in accordance with signals provided by the computing device, and the duty-cycle is further in accordance with the periodicity.

In some embodiments, the self-powered device further includes instructions for combining messages that are to be communicated to the computing device in order to reduce a communication overhead.

In some embodiments, the system further includes one or more additional self-powered devices and a coordination element. The coordination element may assign communication priorities to the self-powered device and the one or more additional self-powered devices in accordance with power budgets for these devices.

In some embodiments, the computing device further includes instructions for providing an acknowledgement message to a sending self-powered device with a higher priority than other types of messages.

In some embodiments, a circuit converts an external energy source into signals that power the self-powered device. The external energy source may include light.

In some embodiments, the circuit includes a component, such as a photovoltaic cell, a wind energy generator, a thermoelectric energy generator, a kinetic energy generator, a piezoelectric device, a magnetic energy generator, and/or a chemical-to-electricity generator.

In some embodiments, the computing device provides control information to the self-powered device.

In some embodiments, the self-powered device includes one or more sensors. The sensor may measure a characteristic, such as temperature, humidity, pressure, vibration, light, motion, sound, proximity, flow rate, electrical voltage, and electrical current.

In some embodiments, the self-powered device may provide configuration information to one or more output devices in accordance with the measured characteristic, the self-powered device's internal status, any received message, elapsed time, local and/or remote user interaction, or a local and/or remote automatic process. The output devices may include a switch, a relay, an electromechanical actuator, a heater, a fan, a speaker, a solenoid, a motor, an electric field generator, a magnetic field generator, and an electromagnetic field generator.

Reference will now be made in detail to various embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

The following description describes various self-powered devices ("SPDs"), systems that include SPDs, and methods for operating SPDs and the systems that they operate in. SPDs are devices that are configured to operate solely under power sources from external energy sources, such as light, thermal, kinetic, wind, wave or other energy. In some embodiments, the SPDs may also be powered by battery power and/or using a power line at ~50 or ~60 Hz.

The SPDs may include a variety of features and/or functionality (i.e., hardware and/or software) to conserve power. In particular, the SPDs may use duty-cycle power management in which the SPDs alternate between low and high-power modes of operation, based on a power budget. SPDs may also alternate between many different power-consumption modes. Furthermore, the SPDs may communicate with computing devices during communication windows. This communication may be periodic and may utilize pre-determined time windows. For systems that include multiple SPDs, a communication priority may be assigned to a given SPD based on its power budget, with a higher priority accorded to devices that have a lower power budget. The SPDs may also combine messages in order to reduce communication overhead and/or give higher priority to providing acknowledgement messages over other types of messages.

Figure 1:
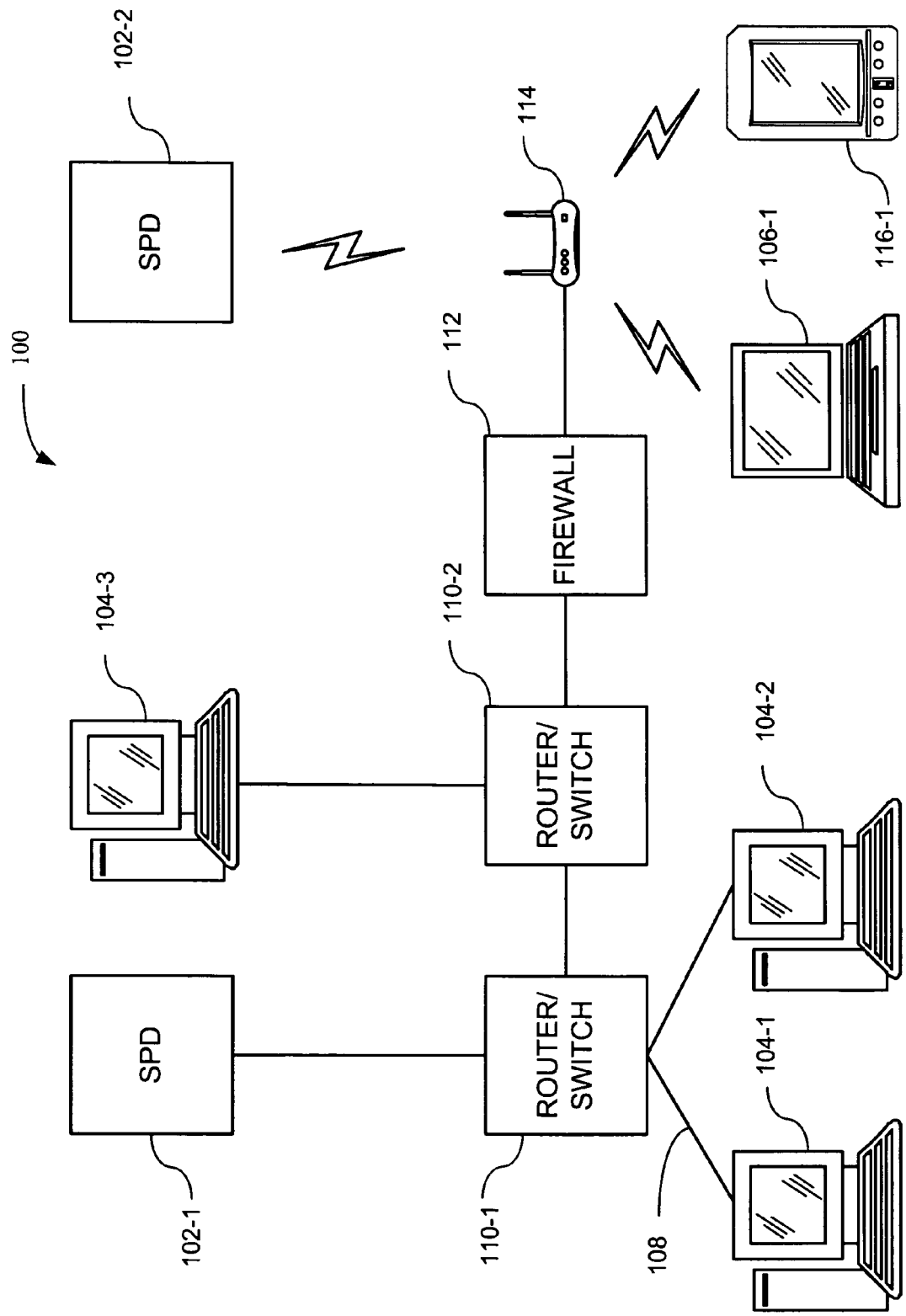
FIG. 1 is a block diagram illustrating an embodiment of a system including one or more self-powered devices.

FIG. 1 is a block diagram of a system 100 including one or more self-powered devices 102. The system 100 may also include other computing devices, such as desktop or stationary computers 104, laptop computers 106, personal digital assistants 116, cellular telephones, or the like. These computing devices may be connected to one another via one or more routers or switches 110, firewalls 112, wireless access points 114, fixed network connections 108, or other computer networking equipment, such as computers, cables, switches, firewalls, routers, bridges, gateways, or the like. These computing devices are generally located remotely from the SPDs 102.

In some embodiments, the system 100 has a single connection link between an SPD (such as SPD 102-1) and a remote computing device (such as computing device 104-1), while in other embodiments there may be many wired and/or wireless links between one or more of the SPDs 102 and the computing devices 104, such as Universal Serial Bus (USB), Firewire, Ethernet, coaxial cable, copper telephone line, optical fiber, wireless, infra-red, or the like. For example, SPD 102-2 may couple to the system 100 via a WiFi (Wireless Fidelity—IEEE 802.11x wireless networking protocol) access point 114. Also, the system 100 may communicate over private or public networks, such as an intranet and/or the Internet.

Figure 2:
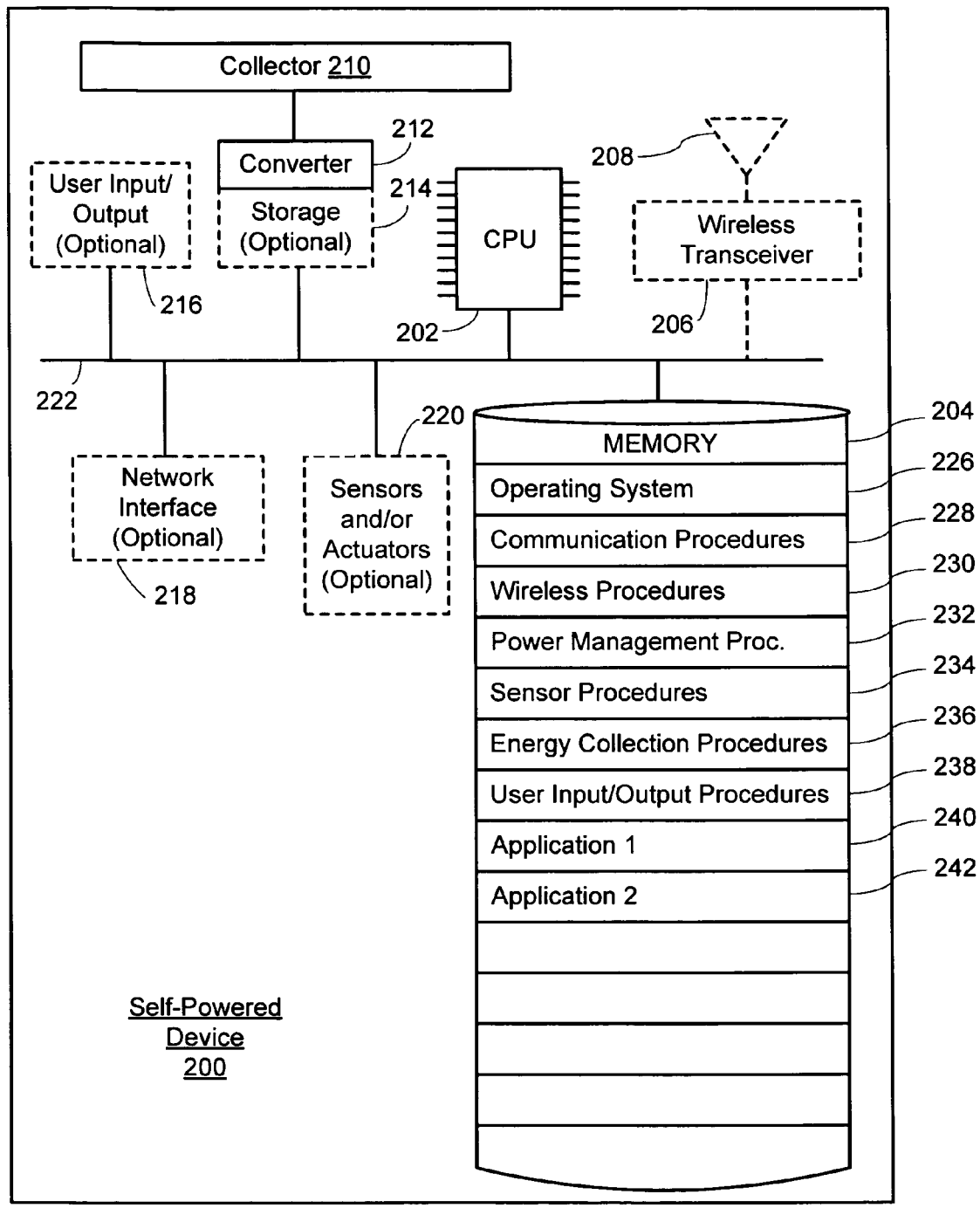
FIG. 2 is a block diagram illustrating an embodiment of a self-powered device.

FIG. 2 is a block diagram of an embodiment of one of the self-powered devices 102 shown in FIG. 1. SPD 200 contains a plurality of components, such as at least one central processing unit (CPU) 202, memory 204, an optional wireless transceiver 206 coupled to a wireless antenna 208, an energy collector 210, an energy converter 212 with an optional energy storage device 214, optional user input and/or output devices 216, an optional network interface 218, one or more optional sensors and/or output devices like actuators or one or more sensor/actuator interfaces 220 configured to be coupled to the one or more sensors, and at least one bus 222 that connects the aforementioned components. Different embodiments may include some or all of these components. Also in some embodiments, these components are, at least partially, housed within a housing 250, where the housing may be configured to withstand direct exposure to the elements, such as sun and rain.

The CPU 202 may include programmable or non-programmable circuits, such as ASICs or microcontrollers. This circuitry typically includes non-volatile memory to retain programmed memory 204 functionality, event logs, and/or data, even after a period of power that is insufficient for continued operation. In some embodiments, the data contained in memory 204 may be updated while the SPD is deployed, in response to either local and/or remote instigation, allowing new and/or different capabilities to be added to the functionality.

Using the memory 204, the CPU 202 operates and manages the remainder of the components in the SPD 200. In some embodiments, some SPDs may also operate and manage other SPDs in the system 100 (FIG. 1).

The wireless transceiver 206 includes a transmitter and receiver configured for transmitting and receiving radio signals via the antenna 208.

The energy collector 210 is any suitable mechanism for collecting energy from the surrounding environment in which the SPD is located. For example, the energy collector 210 may include photovoltaic cells that generate electrical energy from light, wind energy generator(s), thermo-electric energy generator(s), kinetic (motion) energy generator(s) (such as piezoelectric devices), magnetic/inductive energy generator(s), chemical-to-electricity generator(s), etc. Furthermore, the energy collector 210 may collect electromagnetic energy from, for example, a system of antenna(s) and rectifying device(s), or other suitable means. In addition, in some embodiments, electrical energy may be collected via signals received through the network interface 218. In other embodiments, energy may be collected from more than one of these sources at the same time, or at different times. Also in some embodiments, energy collection may be supplemented with more traditional power sources, such as replaceable batteries, AC (line) power, an external DC power supply, Power-over-Ethernet, or the like.

In embodiments where the collector 210 generates power from light, the collector may include one or more photovoltaic (PV) cells (also known as "solar cells"). These cells absorb incident radiation (light) and convert that radiation to electrical energy. In addition to the PV cell(s) themselves, the collector may contain any necessary interconnections to form a series and/or parallel array of cells. The properties of the electrical energy generated by a PV cell, for a particular intensity of incident light, are typically characterized by an open-circuit voltage $V_{OC}$, a short-circuit current $I_{SC}$, and a maximum power delivered $P_{MAX}$, which occurs at a particular output voltage $V_{MAX}$ (where $V_{MAX} \leq V_{OC}$) and output current $I_{MAX}$ (where $I_{MAX} \leq I_{SC}$). (For many PV cells, $I_{SC}$ and $I_{MAX}$ are roughly proportional to the intensity of the incident light across several orders of intensity magnitude, whereas $V_{SC}$ and $VM_{AX}$ are comparatively constant, perhaps changing by a factor of only 2 or 3 across the same large variation of incident lighting conditions).

The PV cells may be based on a number of different technologies, including monocrystalline silicon, multicrystalline silicon, amorphous silicon, thin-film, or other photovoltaic technologies. If the collector 210 uses more than one cell, the cells may be connected together in series to provide a higher voltage than a single cell, in parallel to provide a higher current, or in a hybrid configuration to provide higher current and voltage than a single cell. The cells may be physically arranged at the best possible location to receive incident light, such as above the SPD. In some embodiments, the cells form an integral part of the SPD housing so as to not detract from the appearance of the device. Also in some embodiments, energy collection procedures 236 (described further below) are configured to notify the user of the power output from the collector 210, such that the user may determine the best physical location of the cells for optimal energy collection. For example, the SPD may display an indication or emit an audible tone that varies and/or is representational of the instantaneous collected power. Since the SPD may have the ability to store excess collected energy, the ability to maximize the collected energy over some extended time may be particularly valuable for some SPD applications.

In some embodiments, the SPD 200 is intended to be used over a wide range of lighting conditions, varying from direct sunlight to low-level indoor fluorescent lighting. In these embodiments, the SPD 200 may efficiently collect and convert the incident light energy to usable electricity. Selection of the appropriate type and size of PV cell(s) to use for a particular embodiment of the SPD 200 is typically determined by the corresponding power required, expected radiant light conditions, and cost constraints for that embodiment of the SPD 200.

The energy converter 212 is electrically coupled to the collector 210 and the optional energy storage device 214. The converter 212 converts the energy collected by the collector 210 into a form that is usable by the SPD 200. Typically, this conversion is from one voltage to another, for example from the maximum power voltage (Vmax) of the PV cell(s) to the appropriate supply voltage(s) of the rest of the subsystems in the SPD 200. The storage device 214, which may more generally include an energy storage device such as a battery or capacitor, stores the converted energy for later use by the SPD 200. When excess energy is collected, this excess energy is stored until the battery 214 is fully charged. When there is insufficient energy being collected, the battery 214 provides additional energy until it has discharged or reached a minimum useable level. If the energy from the collector 210 is otherwise deemed adequate for use by the SPD 200, then the battery 214 of the collector may be minimized or eliminated.

For some embodiments, the SPD 200 may need a useful life of many years, and the converter 212 may need to operate over this lifetime without requiring replacement of any internal energy storage device(s), such as the battery 214. This lifetime may need to be maintained over the expected range of operating temperature and humidity, and also after many charge/discharge cycles, in some cases many of these cycles every day.

The network interface 218 and/or wireless transceiver 206 may include hardware as well as associated firmware and/or software components. The network interface 218 provides communications connectivity to the remainder of the system 100 (FIG. 1) via wired connections, while the wireless transceiver 206 and antenna 208 provide communications connectivity to the remainder of the system 100 (FIG. 1) via wireless connections. Some embodiments may include both wired and wireless connectivity, while other embodiments may include one or the other. Furthermore, some embodiments may include more than one network interface 218 and/or wireless transceiver 206. In still other embodiments, no network interface 218 or wireless transceiver 206 is provided, as the SPD 200 does not require connectivity to the system 100 (FIG. 1), such as for stand-alone sense-and-display or sense-and-control applications.

The network interface 218 may be of any suitable type, such as a parallel interface, a serial interface, or the like. These interfaces may be based on a proprietary format or on industry-standard protocols, such as SCSI, printer-style Parallel Port, ESDI, GPIB, PCI, RS-232, Ethernet, I2C, USB, FireWire, Token Ring, DS1, or DS3. For purposes of this discussion, the possible wired connectivity also includes communication through optical fibers. These optical-fiber-based communications protocols may similarly be serial or parallel, and may be based on industry standards (e.g.—Fiber Channel, OC-3, OC-12, etc.) or may be proprietary in nature.

Possible wireless connectivity for the wireless transceiver 206 include radio-based protocols, light-based protocols, magnetic-induction-based protocols, or other methods of communicating that do not require some sort of physical connection. Radio-based interfaces may be based on industry standards, such as Wi-Fi (IEEE 802.11-based protocols), BlueTooth, RFID, and other interfaces known to those skilled in the art, or may be proprietary in nature. Light-based protocols may be industry standard (e.g.—IrDA, or other industry-standard protocols) or may be proprietary in nature.

The user input and/or output devices 216 may include input devices for controlling the SPD 200, such as one or more buttons or switches, a keyboard, a touch screen, a proximity sensor, a microphone, and other input functions known to those skilled in the art, or some combination of these. The user input and/or output devices 216 may also include output devices, such as one or more indicators (such as light-emitting diodes, or passive reflective indicators), multi-digit numeric or alpha-numeric displays, an array of pixels (such as bit-mapped LCD screen or another pixeled array of indicators), speakers, or the like. Inputs and outputs may be initialized and/or updated, through an automatic process and/or through user interaction, and coordinated remotely and/or locally at the installed location.

A number of techniques can be used to conserve the power of the user input/output devices, including operating the output devices at a lower duty cycle or turning the output devices off when available power is low. Depending on the underlying technology, displays may also be dimmed, or operated at reduced contrast or refresh rate, with different encoding/decoding parameters, and other power-conservation techniques known to those skilled in the art. In addition, various forms of input and output functions may be combined, such as the use of proximity sensors as a "user input" so that the display may activate automatically when sensing a user's presence.

The sensory I/O subsystem, if present, may include input and/or output functionality. For example, the sensors may include input device(s), such as temperature, humidity, pressure, vibration, light, motion, sound, proximity, flow rate, electrical voltage, and/or electrical current sensors; and/or output device(s), such as relays, electromechanical actuators, heaters, fans, speakers, solenoids, motors, electrical and/or magnetic field generators.

The memory 204 may comprise Random Access Memory (RAM) and/or Read Only Memory (ROM). The memory 204 may include an operating system 226 that has instructions for communicating, processing, accessing, storing, or searching data. Examples of suitable operating systems include embedded LINUX or a proprietary or scaled-down operating system. In addition, memory 204 may include communication procedures 228, wireless procedures 230, power management procedures 232, sensor procedures 234, the energy collection procedures 236, input/output procedures 238, and other applications, such as applications 240 and 242.

The communication procedures 228 are used for communicating with the remainder of the devices in the system 100 (FIG. 1). The communication procedures 228 may also control power management of the wireless transceiver 206 and/or network interface 218, protocol implementation and participation (such as with 802.11b, etc.), persistent network interface or wireless operating parameter management, network interface statistics management, bridging/routing functions, encryption and security services, etc.

The wireless procedures 230 may work in conjunction with the communication procedures 228 to facilitate wireless communication between other devices in the system 100 (FIG. 1) and the SPD 200. In some embodiments, the SPD 200 may also include a wireless network adapter, for example as at least part of a printed circuit board, that controls communication at the data link level (OSI layers 1 and 2) between an external computing device and the SPD 200.

For some embodiments of the SPD, conserving power is of utmost importance. In these embodiments, numerous techniques may be used to reduce power consumption. One or more of these techniques may be implemented using hardware and/or software, such as the power management procedures 232. For example, power consumption may be reduced by maximizing gain of the passive input components; coalescing messages; explicit attention to latencies; access point placement; duty cycling and/or sleep modes; priority ranking based on power levels; static and/or dynamic tokenization of commonly exchanged information blocks; static and/or dynamic distillation of repeated information blocks; periodic (versus continuous) transceiver enable; peer-forwarding based on power disparities; gateway routing based on power disparities; and other power-conservation techniques known to those skilled in the art.

Thus, in some embodiments the power management procedures 232 are used to reduce power consumption by the SPD 200 by (i) initiating a series of prioritized shutdowns of partial or entire subsystems, when the available power from the collector 210 and/or battery 214 becomes insufficient to keep the SPD 200 fully powered, and/or (ii) ensuring partial or entire subsystems are powered back on, when sufficient power again becomes available to support additional operation usually according to the priority of each function in the subsystem.

The sensor procedures 234 are used to measure variables from the sensors, and/or communicate with output devices. For example, the procedures may be monitoring the sensors for ambient and/or external stimuli, collecting and formatting the information, and then initiating any appropriate action based on that input information. For the output function(s), these procedures initiate, modify, and/or terminate the operation of the output device(s). In conjunction with the power management procedures 232, the sensor procedures 234 also manage the power consumption and operating characteristics of the sensors and/or the output devices 220.

The energy collection procedures 236 are used to control and manage energy collection and storage, such as by (i) monitoring the voltage and current produced by the collector 210, and based on the known properties of the collector 210, determining the intensity of the input energy (light, heat, motion, etc.) to the collector 210 as well as the overall energy being made available to the SPD 200, (ii) ensuring that the current drawn from the collector 210 is adjusted to maximize the power extracted from the collector 210, (iii) ensuring that the or storage device 214 (if present) is properly charged, and/or (iv) monitoring and controlling the available energy stored in the battery 214, etc.

The user input/output procedures 238 control and manage the user input/output devices 216, such as by collecting and formatting (thresholding, debouncing, etc.) the user input, and initiating any appropriate action based on that input. For the output function(s), these procedures are responsible for any necessary formatting/construction of the information to be displayed, as well as updates of that displayed information. In addition to these primary functions, these procedures in conjunction with the power management procedures 232 manage the power consumption of the user input/output devices 216.

Figure 3:
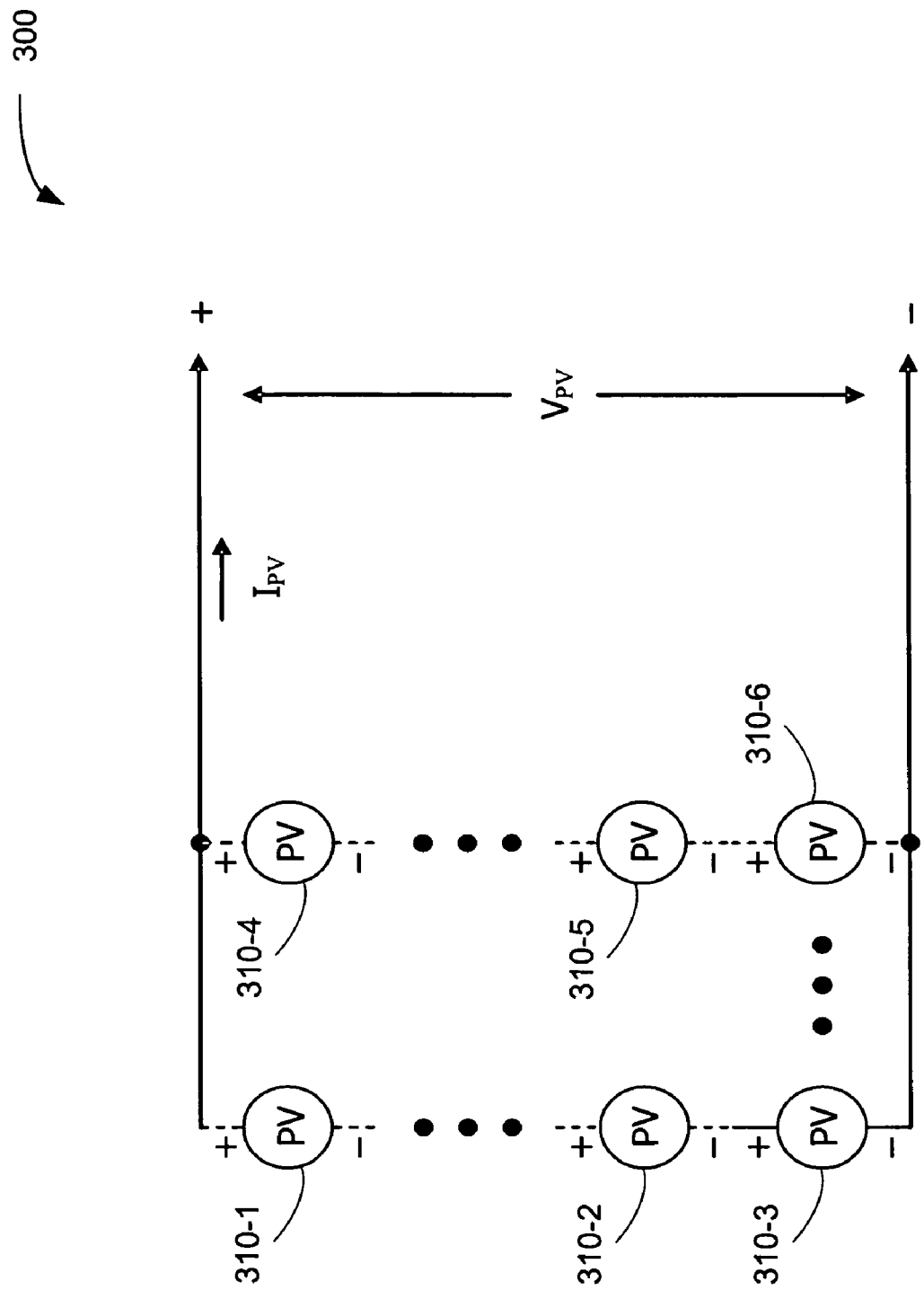
FIG. 3 is a block diagram illustrating an embodiment of a photovoltaic collector of FIG. 2.

FIG. 3 is a block diagram of a photovoltaic collector 300 of a self-powered device, such as the SPD 200 (FIG. 2). As described above, in some embodiments the collector 300 includes one or more PV cells 310 connected together to supply power to the converter 212 (FIG. 2). When illuminated, the interconnected PV cells 310 together produce a current $I_{PV}$ at a voltage $V_{PV}$. In other embodiments, other forms of energy collection and generation of electricity from external energy sources may be used. Whether the generator(s) derive their input power from light, heat, motion, chemical energy, vibration, pressure, network interface communications, other electromagnetic radiation, or some other form of energy, or some combination of these external sources, the electricity produced is characterized by an output voltage at some output current.

An optimal operating point typically exists where the output voltage at a particular output current yields a maximum power from the available input energy, and operation at this optimal operating point may be achieved using the methods described below. Furthermore, more than one of these PV cells 310 may be combined as shown using PV cells of the same or different types. Furthermore, in some embodiments, switching mechanisms are provided so that the presence of one set of PV cells 310 do not adversely affect the operation of another set of PV cells 310, such as when one set is operating, and another set is not operating.

Figure 4:
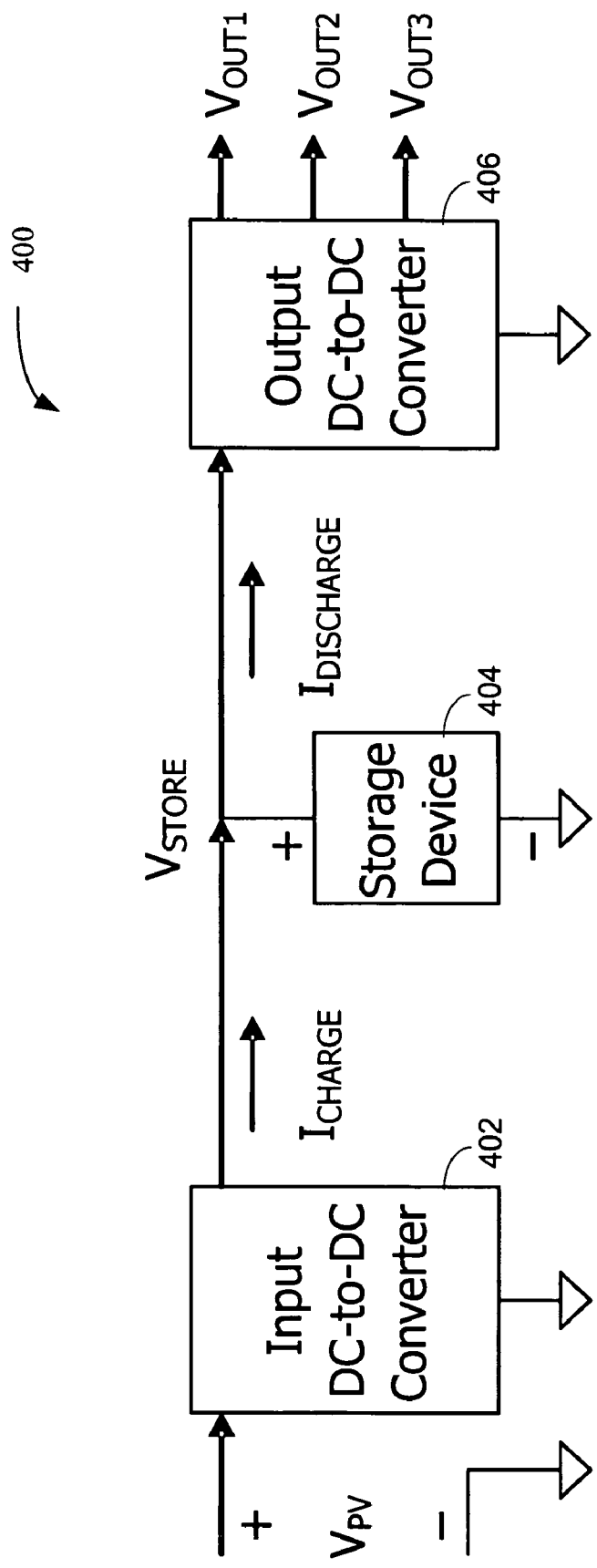
FIG. 4 is a block diagram illustrating an embodiment of a converter and storage system of FIG. 2.

FIG. 4 is a block diagram illustrating an embodiment of a converter 400, such as the converter 212 (FIG. 2). In some embodiments, the converter 400 includes an input DC-to-DC converter 402, a storage device 404, and an output DC-to-DC converter 406. The input DC-to-DC converter 402 transforms the current coming from the collector at $V_{PV}$ to the voltage $V_{STORE}$ of the storage device 404. The output DC-to-DC converter 406 transforms the current flowing from the storage device 404 to the voltage(s) used by the other subsystems in the SPD, known as $V_{OUT1}$, $V_{OUT2}$, etc. These output voltages may be the same or different depending on the requirements of the SPD. If present, the storage device 404 includes one or more physical rechargeable storage devices interconnected in series and/or parallel that meets the requirements of that embodiment. One should note that in some embodiments, a storage device may not be required. In these embodiments, all that is required is to convert the input voltage derived from the collector 210 (FIG. 2) to the output voltage required by the rest of the subsystems in the SPD. Additionally, other embodiments do not require the input DC-to-DC converter 406, if the optimal voltage supplied by the collector 210 (FIG. 2) is within a predefined acceptable range. Likewise, some embodiments do not require the output DC-to-DC converter 406, if the rest of the subsystems in the SPD are able to operate using the output voltage from the storage device 404.

Figure 5:
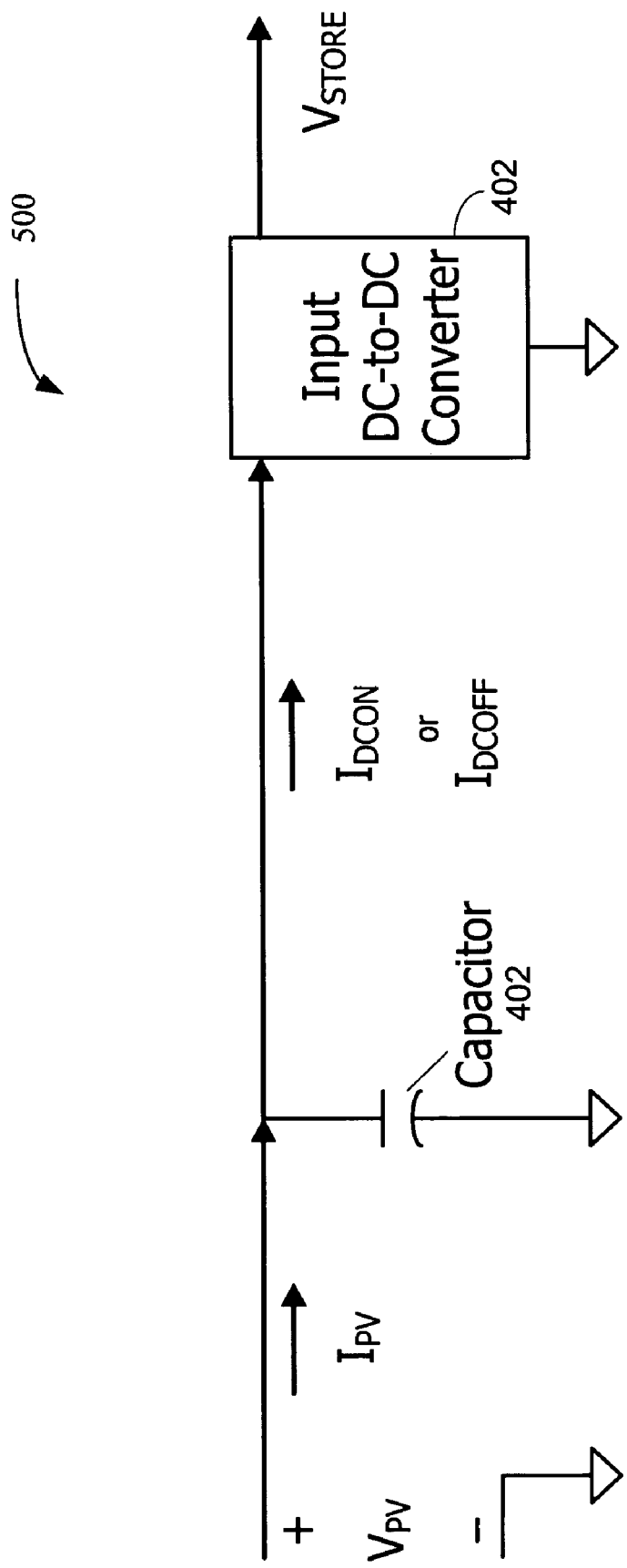
FIG. 5 is a block diagram illustrating an embodiment of the current flow from the collector of FIG. 2.

FIG. 5 is a block diagram illustrating an embodiment of the current flow 500 from the collector 210 (FIG. 2). In order to maximize the power taken from the collector 210 (FIG. 2), the converter 212 (FIG. 2) attempts to maintain the current flowing from the PV cells 310 (FIG. 3) at about $I_{MAX}$, which yields a voltage of approximately $V_{MAX}$. Since the optimal voltage $V_{MAX}$ of the collector 210 (FIG. 2) may be different from the voltage $V_{STORE}$ of the storage device 404 (FIG. 4), some embodiments may make use of a DC-to-DC converter (as described above) to make the voltage transformation, preferably with minimal power loss. Suitable DC-to-DC converters operate in a switching mode, which is to say that they periodically draw some current to "charge" an inductor, then "discharge" that current (at a different voltage) into the load. These two operations may then be repeated when more power needs to be transferred.

For DC-to-DC converters, the time that the current is being drawn into the converter to charge the inductor may be referred to as $T_{ON}$, and the time that the DC-to-DC converter is transferring the stored charge to its load (or is otherwise waiting for the next cycle to begin) may be referred to as $T_{OFF}$. The full cycle time of the converter may be expressed as $T_{ON}+T_{OFF}$. Similarly, the current drawn into the DC-to-DC converter when it is on may be referred to as $I_{DCON}$, and the current drawn into it when it is discharging its inductor to the load (or it is otherwise waiting for the next cycle to begin) may be referred to as $I_{DCOFF}$. In order to maintain the maximum power output from the collector, the time average of these two converter input currents may be kept to about $I_{MAX}$.

For most switching DC-to-DC converters, $I_{DCOFF}$ is approximately equal to 0, and assuming that the converter is on for only a small fraction of its full cycle time ($T_{ON}+T_{OFF}$), the $I_{DCON}$ usually needs to be greater that $I_{MAX}$. Unfortunately, for a DC-to-DC converter operating in these conditions connected directly to the collector 210 (FIG. 2), the current drawn alternates between $I_{DCON}$ during $T_{ON}$ and approximately 0 during $T_{OFF}$, neither of which are the optimal current $I_{MAX}$. Therefore, to maintain the optimal current drawn from the collector at about $I_{MAX}$, a capacitor 510 or other charge-storage device may be connected across the output of the collector, as shown. With the addition of the capacitor 510, when the DC-to-DC converter is on, the net current into the capacitor is $I_{PV}-I_{DCON}$. Since $I_{DCON}$ is typically greater in magnitude than $I_{PV}$, the capacitor 510 is therefore discharging during $T_{ON}$. During $T_{OFF}$, typically $I_{DCOFF} \approx 0$, so the net current into the capacitor 510 is $I_{PV}-I_{DCOFF} \approx I_{PV}$, and the capacitor 510 is charging. The average value of the current into the capacitor 510 may be expressed as $$\frac{(I_{PV}-I_{DCON}) \cdot T_{ON} + (I_{PV}) \cdot T_{OFF}}{T_{ON}+T_{OFF}},$$

which may be set to be approximately $I_{MAX}$ for efficient operation of the collector 210 (FIG. 2). For large capacitances, the drop in the voltage of the capacitor 510 during $T_{ON}$ may be very small, and the rise in the voltage during $T_{OFF}$ may likewise be very small.

Since the average current drawn from the collector 210 (FIG. 2), $I_{PV}$, is now maintained at approximately $I_{MAX}$, the average voltage on the capacitor 510 (and the collector 210 in FIG. 2) is, therefore, approximately $V_{MAX}$. The value of the capacitor 510 is chosen such that the variation in voltage is small enough to be acceptably close to $V_{MAX}$.

As previously stated, the maximum power of one of the PV cells 310 (FIG. 3) typically occurs at a certain current $I_{MAX}$, and at a certain voltage $V_{MAX}$. However, the actual values of this operating point may change with incident light intensity, operating temperature, and may also vary from device to device due to processing and manufacturing differences. This may make it difficult to predetermine the ideal operating point values for any particular device at any particular light intensity and temperature. In some embodiments, the ideal operating point for the PV cell(s) 310 (FIG. 3) may be determined automatically, and furthermore, may be adjusted automatically as operating conditions change, using the following method.

To determine the power being delivered by the converter 212 (FIG. 2), the energy collection procedures 236 (FIG. 2) periodically measure the current $I_{PV}$ from the collector 210 (FIG. 2), and the voltage $V_{PV}$ on the collector 210 (FIG. 2), and multiplies these two values together. One way to increase the average current drawn by the input DC-to-DC converter 402, usually resulting in a reduced $V_{PV}$, is by increasing the on time of the DC-to-DC converter, $T_{ON}$. Likewise, by reducing $T_{ON}$, the average current drawn from the collector 210 (FIG. 2) may be decreased, allowing $V_{PV}$ to increase. Other means to increase or decrease the average current drawn by the input DC-to DC converter may be used.

To maintain the maximum power from the collector 210 (FIG. 2) under varying operating conditions, the energy collection procedures 236 (FIG. 2) (i) measure the power from the collector 210 (FIG. 2), (ii) increase $I_{PV}$ by a small amount, such as 0.1% to 1% of the full value, (iii) measure the power from the collector 210 (FIG. 2), (iv) if power has increased, go to step (ii) above, otherwise continue, (v) decrease $I_{PV}$ by a small amount, such as 0.1% to 1% of the full value, (vi) measure the power from the collector 210 (FIG. 2), (vii) if power has increased, go to step (v) above, otherwise go to step (ii) above. Using this process, the controller may continuously "hunt" for the maximum power delivered from the collector 210 (FIG. 2). As the operating conditions vary, this procedure may allow those changes to be tracked by the SPD, allowing the energy collection procedures to continuously adjust the operating point of the collector 210 (FIG. 2) in order to achieve maximum power delivery.

To prevent operating at only either the maximum current $I_{SC}$ or the maximum voltage $V_{OC}$, which may happen under very low lighting and/or other extreme conditions, when it may be difficult to determine how the power from the collector 210 (FIG. 2) has actually changed, the procedure may be modified to switch the direction of the "hunt" if the change in $I_{PV}$ value has moved in the same direction for the last 10 or 20 (or other appropriate number of) steps or iterations. This means that under extreme operating conditions, the operating point of the collector 210 (FIG. 2) may be scanned across a wide range of possible operating points to increase the likelihood that the maximum power delivery point is found. In some embodiments, to ensure that the storage device 404 (FIG. 4) in the converter 212 (FIG. 2) is maintained within its safe operating parameters, its voltage and/or current may be continuously monitored by the controller.

When the maximum capacity of the battery 214 (FIG. 2) is reached, the controller typically turns off the input DC-to-DC converter. This may be accomplished by setting the on time $T_{ON}$ of the DC-to-DC converter to approximately zero, or otherwise disabling its operation.

When the energy held in the battery 214 (FIG. 2) gets low, and/or is not otherwise being sufficiently recharged from the collector 210 (FIG. 2), the energy collection procedures 236 (FIG. 2) may reduce the power consumption of the other subsystems in the SPD. In some embodiments, the energy collection procedures 236 (FIG. 2) may compare the energy in the battery 214 (FIG. 2) against one or more pre-determined low-energy thresholds, and once the threshold(s) is crossed, the energy collection procedures 236 (FIG. 2) may take one or more action(s) to reduce the energy demand from the battery 214 (FIG. 2), if appropriate.

When the remaining energy in the battery 214 (FIG. 2) drops to the lowest threshold, below which proper operation of the SPD may no longer be guaranteed, in some embodiments, the energy collection procedures 236 (FIG. 2) and/or the power management procedures 232 (FIG. 2) initiate a series of controlled shutdowns of any subsystems that remain on, including the majority of the SPD itself. Once this is accomplished, the SPD may be held in a reset condition, through the use of an automatic circuit, until sufficient energy is delivered to the battery 214 (FIG. 2) to allow initiation of SPD startup.

When the energy level of the battery 214 (FIG. 2) transitions from below the lowest threshold to above that threshold, a subset of the SPD may be automatically brought out of reset and may begin to turn on various subsystems of the SPD, typically in a prioritized sequence, depending upon how much energy is in the battery 214 (FIG. 2), and/or how quickly it is being recharged. As increasing energy becomes available in the battery 214 (FIG. 2) and/or more power is available from the converter 212 (FIG. 2), and the various low-power thresholds are overcome, more and more SPD subsystems may be brought out of any low-power states, until eventually, the SPD may be returned to its full-power mode.

To eliminate unnecessarily repeated or oscillatory transitions between various low-power states, some embodiments may include an appropriate amount of hysteresis to be added to each threshold. This ensures that as a low-power threshold is approached in the decreasing direction, a slightly lower value than the nominal threshold value may be required to be achieved before transitioning the SPD to the next lower-power state. Likewise, when the energy in the battery 214 (FIG. 2) is increasing, and that threshold is approached, a slightly higher value than the nominal threshold value may be required to be achieved before transitioning from the previous low-power state. The amount of hysteresis for each threshold level is chosen to minimize oscillatory transitions, yet not make the actual transition points too different from the nominal threshold value.

Figure 6:
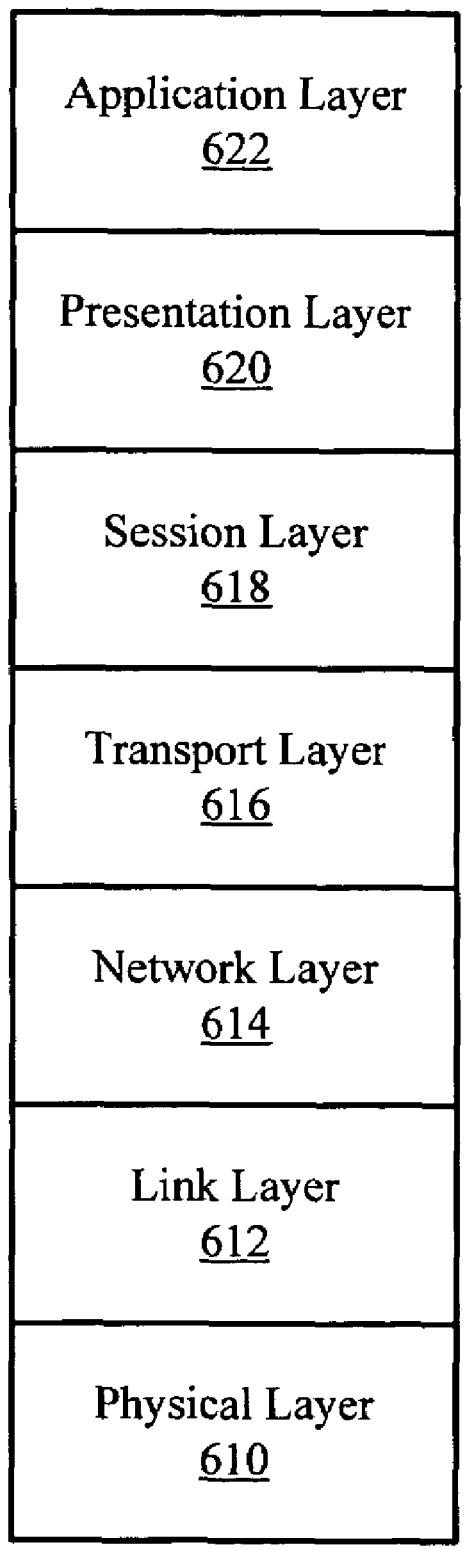
FIG. 6 illustrates an embodiment of a software protocol stack for the network interface of FIG. 2.

In a given embodiment, there may be zero or more network interfaces, such as the network interface 218 (FIG. 2), of one or more types. The specific type(s) of network interfaces utilized in an SPD do not necessarily imply a specific network behavior, and may include technologies such as, but not limited to, wired interfaces (RS-232, RS-485, USB, Ethernet, FDDI, Fiber Channel, or any other wire- or cable-based protocol, standard or proprietary) and wireless interfaces (Bluetooth, Zigbee, IrDA, UWB, Wi-Fi, GPRS, GSM, CDMA, or any other wireless protocol, standard or proprietary). As illustrated in FIG. 6, typically each network interface includes the following hardware and software layers, as defined by the classic OSI networking reference model: physical layer 610 (such as RS-232, 100BaseT, T1 and radio), link layer 612 (such as Ethernet, FDDI, Wi-Fi and HDLC), network layer 614 (such as IP, IPX and similar protocols), transport layer 616 (such as TCP, UDP, RTP and SMB). Higher layers, such as session layer 618, presentation layer 620 and application layer 620, may be viewed as part of the client software, so are not discussed as part of the network interface itself.

In many embodiments, one of the key attributes of the network interface may be its operation on an extremely low power budget. This is discussed further below.

Numerous issues may affect power usage in an implementation of the network interface, including range requirements, the amount of power consumed per unit of time, the amount of power consumed per bit conveyed, and any needed networking layer overhead from the associated network interface software stack and its impact on the power consumed in generating, transmitting, receiving, and processing that overhead.

In general, the power consumption of a communication subsystem increases with the amount of data communicated and the distance that the communications traverse. Similarly, a low-bit-rate communications system may generally be designed to consume less power per unit of operating time than a high-bit-rate system, but may have a higher cost per bit communicated. Finally, communication subsystems based on newer, specialized, and/or proprietary communications protocols often consume less power for a given transmission distance or bit rate than existing, general-purpose, and/or standardized protocols.

Keeping in mind these general characteristics, the design, implementation, and usage of each network interface for a particular embodiment of an SPD may have various constraints including (but not limited to):

The need for wireless vs. wired operation.
The distance required for data transmission.
The volume of data to be transferred for the SPD application.
The sensitivity of the application to data stream latency.
The frequency of communications needed to meet protocol requirements.
Any compatibility requirements with installed network infrastructure.
The average power available to the network interface subsystem
The tolerable cost and/or size of the subsystem Several methods to reduce average power in the network interface subsystem are described here. Embodiments of the SPD may use one, many, all, or none of these methods and strategies. Some strategies outlined are applicable to any network interface technology while others are applicable only to one or some network interface technologies.

One class of radio computer network technology is based on the IEEE 802.11 set of standards, commonly referred to as "Wi-Fi". Versions of this standard support various transmission distances and bit rates, and existing equipment may support more than one version simultaneously. In an exemplary embodiment, therefore, the SPD may be used with one or more IEEE 802.11 "Wi-Fi" Protocols. Implementation in embodiments that support a compatible version of Wi-Fi may typically not require installation of an additional wireless access point(s) in the external computer network. Instead, an existing, i.e., an already-installed, access point(s) may typically be used. In some cases, the access point functionality may already be incorporated into the remote device(s), such as computer devices 104 (FIG. 1), with which the SPD(s) 102 (FIG. 1) communicate.

An additional advantage of using a Wi-Fi radio is that the components needed to implement the radio are often readily available, physically small, and relatively inexpensive. The Wi-Fi data rate may also be high enough for most SPD applications. However, the existing component sets may consume relatively large amounts of power, even when not transmitting. Thus, in some embodiments, various schemes to dramatically reduce the power consumption of the Wi-Fi radio may be employed.

In some embodiments, the SPD includes sleep modes and/or duty-cycle control. Selectively shutting down or turning off some or all of circuits in the physical-layer networking subsystems may offer the ability to reduce power consumption. These features are typically referred to as "sleep modes". The duty cycle of such subsystems is the ratio of the time the subsystem spends in the "on" or "awake" state compared with the total time. Assuming the higher-layer protocols and/or applications may tolerate it, adjusting the duty-cycle of the network interface may allow the controller to reduce power consumption of the subsystem without requiring additional external hardware and/or reconfiguration of the device.

For some network interface technologies, a high-rate of power consumption when active may be more than offset by the low power consumption from remaining in sleep mode the majority of the time and powering the subsystem for the minimum time necessary to effect communication. Thus, for a given amount of data to be transferred, some implementations of the network interface may have a high power-per-unit-of-time cost but may still be efficient in the cost of the power per bit communicated.

This approach accepts a high power draw for short periods of time because it seeks to optimize the power per bit communicated through the network interface. It is possible for such an implementation to consume less average power than an implementation using a low-bit-rate protocol, because the network interface may spend substantially less time powered on even though the network interface is drawing more power when it is powered on.

Often, it is not known beforehand when a message must be sent from an SPD to a remote device, such as one of the computer devices 104 (FIG. 1), and vice-versa. In particular, if the network interface in an embodiment is operated with duty-cycle control (as described above and further below) then its transceiver spends some of its time active, and some of its time disabled in a sleep mode. If a message is to be properly communicated, the transmitting device must be enabled, and the receiving device must likewise be enabled in order to detect the message and properly receive it.

When there are no power consumption constraints, the transceiver circuits in each device may be left enabled all of the time. In some embodiments, however, there may be power consumption constraints, so it may be desirable to use duty-cycle control as a power management technique. To ensure that message communication may occur reliably under these conditions, the duty cycles between the transmitting and receiving devices needs to be aligned such that the transceivers are enabled in each device at the same time.

Figure 7:
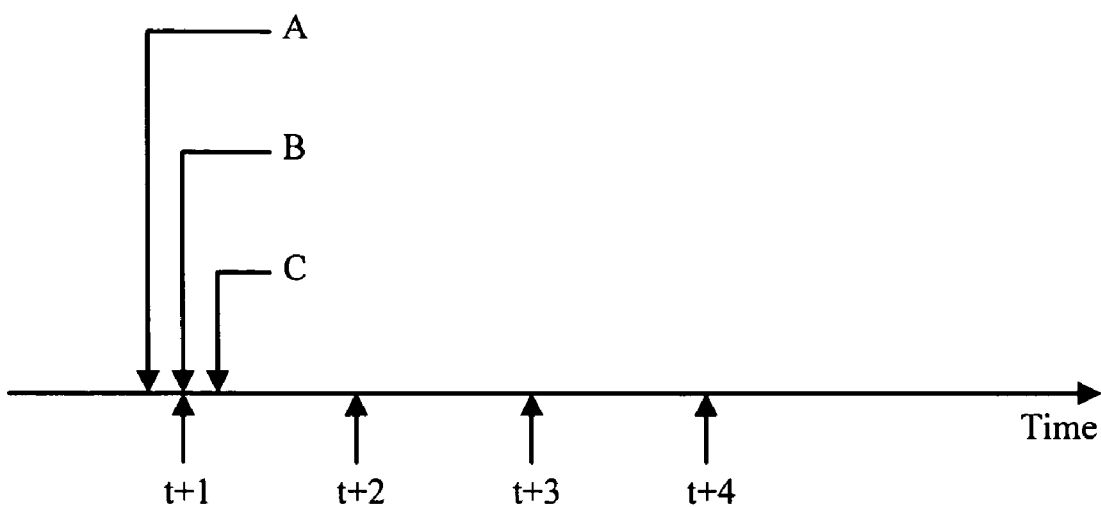
FIG. 7 illustrates periodic enabling of a transceiver of FIG. 2.

By using periodic communication windows, the duty-cycle alignment may be achieved through synchronization. This assures that the transmitter in the sending device and the receiver in the receiving device are enabled at the same time. This is illustrated in FIG. 7, in which (a) transceivers are enabled just prior to the communication time window, (b) communication occurs, often lasting just long enough to initiate a session (see FIG. 6) that will span numerous enable periods, and (c) each SPD shuts down its transceiver as soon as it can, but no later than after some limited period of time.

In some embodiments, therefore, periodic transceiver enabling is used. Different network interface protocols may support such enabling. For example, a sparsely populated Wi-Fi network may be used in conjunction with a periodic beacon signal having an appropriate rate. The periodic beacon signal may be adjustable. The periodic beacon signal notifies some or all radio NICs (the Wi-Fi nomenclature for a remote node versus an access point) of its presence, timestamp, supported rates, capabilities, and an indication of any traffic waiting to be transmitted (TIM). In concert with the beacon signal, a Wi-Fi NIC may be kept in sleep mode for an interval just short of the beacon signal interval, and then be automatically woken-up in time to receive the beacon signal. The NIC may then determine if there is any traffic queued up for it to receive, and then receive the traffic (if any). It may then send the pending items it has queued for transmission (if any), and then go to sleep again until the next beacon signal interval.

In some embodiments, to reduce the power consumed by a Wi-Fi radio subsystem that uses commercially-available chip sets, yet still maintain an adequate communications bit-rate, the radio may be kept in a low-power "off" or "standby" mode as much as possible. In some embodiments, the standby mode may be used the majority of the time. One way to do this is to take advantage of Wi-Fi's beacon feature, described above, whereby the Wi-Fi access point associated with an SPD periodically polls the SPD (and any other associated remote Wi-Fi devices the access point is aware of) at regular pre-set intervals. The beacon signal interval may often be set at once per 100 ms (although a different interval may instead be configured in the access point). By monitoring the beacon signal activity, the SPD determines the beacon signal period, and so knows when the next beacon signal will occur, thus when it must awaken to receive the next beacon signal.

By placing the SPD's radio in a low-power "off" or "standby" mode until just before the beacon signal arrives, the SPD's controller may ensure that the SPD radio is active during the beacon signal time so as to transfer any data to or from the access point, and then return the radio to its low-power state as soon as the data transfer is complete. Assuming the beacon signal interval is not set to be unreasonably short, this strategy may allow the SPD radio to spend the large majority of its time in a very low power state, yet still maintain sufficiently low transmission latencies and adequate data throughput to support typical SPD operation.

Some techniques used to reduce power consumption in the network may benefit from having an SPD synchronized in some way with one or more other nodes and/or access points in the network. If all nodes and/or access points participating in the communications exchange are synchronized then they will know when to enable their transceivers for periodic communications.

In one embodiment, synchronization may be achieved using the Network Time Protocol (NTP) that is typically available in computer networks that adhere to the Internet Protocol (IP) set of standards. By utilizing the NTP facilities available in the network, an SPD and other nodes may accurately determine the time of day, and from this information, facilitate their periodic communications.

In another embodiment, synchronization may be achieved by leaving the SPD's network interface receiver enabled long enough to receive several periodic transmissions. By observing the periodicity of the transmissions, the SPD may then enter a sleep state between the periodic transmissions, gradually increasing the length of the intervening sleep states until the duty cycle of the network interface is low enough to achieve the desired power savings, but high enough to ensure sufficient probability of being awake during the periodic transmissions.

Moreover, standardized communications between computers typically operate in layers. However, additional layers increase overhead costs that negatively impact efficiency, as measured in terms of payload data communicated per unit of energy and/or power consumed. Coalescing messages is a systems approach to efficiency, and allows for communications to be optimized by having additional knowledge about the communicating devices and/or the protocols they are using to communicate.

In a typical embodiment, messages for various purposes flow between the SPD and one or more remote device(s). In the event that more than one such message is going to the same remote device, it may be possible to examine the pending messages destined for that remote device and combine the messages into a form of multi-block message so that layering overheads are minimized.

Combining or coalescing messages may be combined with periodic transceiver enabling and duty-cycle control, to create a natural collection or "queuing" point in time where opportunities for combining the messages prior to communication may be found.

Most messages to and from an SPD may be categorized into various classes. Attention messages include a message from a client node on the network requesting information or service from a server node. Information messages include a message to or from an SPD containing information. This message may be in response to an Attention Message, and/or may contain unsolicited information. Ack/Nak Messages include a message to or from an SPD indicating that a previous message is being acknowledged, or negatively acknowledged.

In an exemplary embodiment of coalescing, an information block consisting of 1000 bytes in total of data is to be sent from a remote device to an SPD. Even though the 1000 bytes are to be sent from the same remote device to the same SPD, because of the way the information block is typically created using modern software methods, it is often sent as a series of smaller messages, each consisting of 50 to 100 bytes of payload data. Each message, if sent individually over Ethernet, typically may have a wrapper that includes the UDP header, the IP header, and the 802.3 header, plus the preamble. In total, this may double the number of bits transmitted in each message, as compared with just the bits in the payload data. Therefore, coalescing these messages into a multi-block message may require a frame to indicate the coalescing behavior (perhaps 4 bytes) and an additional approximately 2 bytes per block of data to demarcate each sub-block for later extraction. This multi-block message may still have the UDP header, the IP header, the 802.3 header, and the preamble, but only one for each of these, thus requiring approximately one tenth the overhead necessary as compared with no coalescing of the information.

Communicating a message from one computer to another generally involves some form of acknowledgement (positive or negative) that the message was seen, acted on, or otherwise processed. When an SPD sends a message to a remote device, the time that the SPD spends waiting for acknowledgement to return from the remote device may often be time that the SPD is waiting with its network interface and/or other subsystems powered on. Minimizing the time waiting for the return Ack/Nak Message minimizes the overall time that the SPD subsystems remain powered on, thus reducing the average power consumption of the SPD.

There are a variety of ways such latency may be reduced or minimized, including:

Arrange for the remote device to acknowledge a message immediately upon its receipt by the remote device, and not to wait for the message to be fully processed and/or any message-requested action to be completed.

Arrange for the remote device to acknowledge a message as a high-priority task in its internal task-scheduling algorithm.

Allow the remote device to coalesce the Ack/Nak Messages it needs to return to an SPD and then let the SPD "decoalesce" them upon receipt for distribution to the SPD's internal sending entities. The coalescing of Ack/Nak Messages by the remote device may be performed separately for each SPD that is communicating with the remote device.

Process the messages where the sender is awaiting a response preferentially over other message types.

Some, all, or none of the above methods may be used in an SPD and/or remote device implementation in order to reduce the power consumption and/or otherwise increase the operating efficiency of an SPD.

In applications where a remote server is handling information for multiple requesting SPDs, there may arise cases where some SPDs have a lower average power budget than others. In such cases, the scheduling of resources when dealing with multiple SPDs simultaneously may favor those with lower power budgets to minimize the impact of latency on their power budgets.

Figure 8:
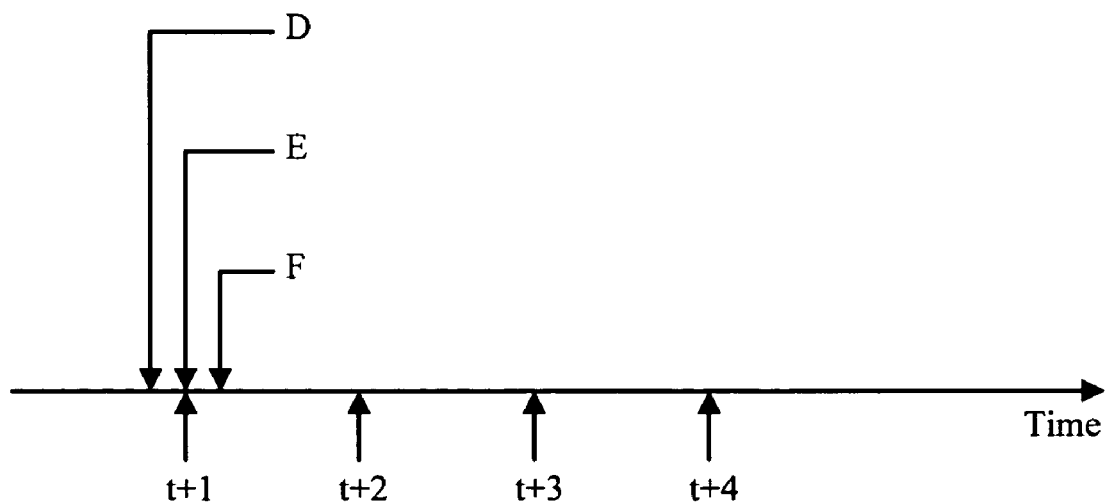
FIG. 8 illustrates coordinated communication.

In the case of multiple SPDs requesting communication in an environment using periodic transceiver enabling, one technique to optimize power consumption includes a coordinating element (such as the server handling the requests) giving preferential permission to communicate to the energy-poor SPD(s) ahead of the energy-rich SPD(s) during the period of permitted communication. The energy-poor SPD(s) may then disable their network interfaces(s) and/or other subsystems sooner, better conserving their less-abundant power than the energy-rich SPDs. This approach is illustrated in FIG. 8, in which (d) transceivers are enabled just prior to the communication time window, (e) numerous SPDs vie for the ability to communicate, so a coordinating element (such as a server) utilizes a token scheme to control which SPDs communicate thereby allowing energy-poor nodes to communicate preferentially in order to allow them to disable their transceivers sooner and save power, and (f) each SPD shuts down its transceiver as soon as it can, but no later than after some predetermined and limited period of time.

In the case of multiple SPDs requesting service from a remote device, another technique to optimize power consumption includes the server preferentially servicing the power-poor SPD(s) ahead of the energy-rich SPD(s) if requests from more than one SPD are pending completion at the server. Minimizing the response time to the energy-poor SPDs may help them conserve their less-abundant power by allowing them to place their network interface(s) and/or other subsystems in a sleep mode sooner, at the expense of more energy-rich SPDs.

As a refinement on the ideas of periodic transceiver enable and duty-cycle power management, pseudo-time slot allocation may be used. This technique recognizes that multiple SPDs operating in a network or ecosystem may experience contention in communicating, especially to a central point such as a Wi-Fi access point and/or a server. This technique allows each client SPD to attempt to exercise its periodic communications during the same periodic interval, but each in a time slot that occurs at a different, pre-assigned phase within the periodic interval. Just prior to the periodic communications interval, the master/server node may queue up time slot assignment messages, one destined to each client SPD, indicating when the SPD may exercise its right to communicate within the periodic interval. Alternatively, another method of assigning time slots may be used, as long as only one client SPD is assigned a particular time slot, or as long as there is an effective way to handle time-slot conflict issues.

At the beginning of the periodic interval, all SPDs accept one (or a small number of) message(s), to allow the time slot assignment message to be received. Alternatively, this part of the protocol may be eliminated if the time slots have already been assigned through some other method. If the assigned time slot for an SPD has not yet arrived, the SPD may place its network interface and/or other subsystems in a sleep state (if they are not already in such a state) and reawaken them just before the time slot arrives. When the assigned time slot does arrive, the appropriate SPD may then transfer any pending messages with the master/server node.

The method(s) used to assign the order of the time slots may use any number of algorithms or procedures, such as pseudo-random, round-robin, fairness, and other algorithms known to those skilled in the art, and may also offer the most energy-poor SPD in the ecosystem the first right to communicate, followed by the next-most-energy-poor SPD, and so on in an orderly progression. The scheduling algorithms may take advantage of information such as the energy available to the SPD, the estimated energy it may need to communicate, its communications bandwidth and/or latency requirements, how often it has communicated in the past, and/or other relevant information.

In a communications system between computers that implement an application having a predefined function, blocks of information are typically communicated repeatedly, and the contents of some of the blocks may often be known beforehand. For a communications subsystem where every communicated bit represents another reduction in the available power, replacing large blocks of this type with reference tags may reduce the number of bits that must be exchanged to accomplish a given functionality. Receipt of a particular reference tag may indicate to the receiving device that it may replace the reference tag with the associated block of information.

In an exemplary embodiment, an SPD is used to display a calendar. A calendar view may be represented by a series of visual "planes". Each plane may represent something either new to a day's calendar entry or something that does not change from one day to the next. The unchanging elements may be considered background planes that may be stored in the SPD memory and referenced by a symbolic name (a reference tag) that is shorter than the image they represent. Typically, when displaying a calendar, the elements that must change regularly from one day's view to the next are few, and are generally the label for each block of allocated time. All other items may effectively be referred to by the reference tag, effectively reducing the number of bits that must be transmitted to display the calendar view.

An enhancement to traditional static distillation (as described further below) is a process of dynamic distillation of repeated blocks. In this dynamic process, a server (either an SPD or a remote device) may associate a block of information represented by a reference tag "on the fly". After establishing the meaning of the reference tag with the client (either a remote device or an SPD), the server thereafter utilizes the tag to communicate the intended information in a more cost-effective manner than communicating the information itself.

In an exemplary embodiment, an SPD is used to display a calendar. Consider a block of time on the calendar with a label describing that block of time. If the total calendar time was 8 hours and the label applied to a 30 minute interval, the label describing that time frame may typically be transmitted to the SPD, in full, approximately 16 times. Conversely, sending a single message to define the label image along with its reference tag may allow use of just the tag in all subsequent communications, thus reducing the amount of information transmitted (and possibly stored).

As discussed previously, it is often the case that proprietary and/or shorter range communication protocols may operate on less power than standard and/or longer-range protocols. In addition, it is possible for the different SPDs in a network or ecosystem have vastly different power budgets due to available energy conditions, opportunity for wired operations, or other factors. In such cases, a gateway/peer-forwarding behavior may be implemented that utilizes SPD power reserves as a link-cost metric. Combined with routing behaviors among SPDs in an ecosystem, such a routing algorithm may provide the optimal communications path by allowing the energy-rich SPD or SPDs to operate as gateway nodes to other parts of the network.

In an exemplary embodiment, a Wi-Fi transceiver and a very-low-power radio transceiver are provided as network interfaces in each of several SPDs in a network. The SPDs communicate with each other and with a non-SPD remote device. The Wi-Fi network interface has a power-per-bit-communicated cost of transceiver operation that is many times what the same bit costs to communicate over the very-low-power radio link. Furthermore, at least one of the SPDs may have an abundant energy source. In such a case, the SPD that has abundant energy may be selected to communicate through its Wi-Fi network interface to the remote device, forwarding messages to and from the other SPDs through its very-low-power radio link. The other SPDs, which may have relatively scarce energy sources, may therefore communicate through their very-low-power radio links, and, therefore, reduce the power consumed for communications.

In addition, some embodiments of the SPD contain software and/or hardware mechanisms to aid in the placement of an entire SPD and/or access point. These mechanisms may be utilized in order to maximize the quality of the wireless networking signal in order to improve communications bandwidth, to reduce the communications error rate, and/or to reduce the power consumed for communications. For example, in some embodiments the SPD includes a mechanism that displays an indication or emits an audible tone that varies proportionally with and/or is representative of the quality of the communications signals, to aid in the placement of the SPD and/or access point.

In addition to (or instead of) optimizing the placement of SPD nodes and/or access points, the existing placements may be utilized along with a mechanism to additionally take advantage of the nodes and/or access points with better placements. As an extension to the concept of gateway operations for wireless networks (described further below), the SPD may dynamically or statically select which SPD and/or access point is to be used as the gateway for the others based on a combination of SPD energy reserves and/or communications signal strength.

In an exemplary embodiment, obstructions may sometimes severely influence the signal strength seen by a wireless node on a network. Moving the antenna, emitter and/or detector for an access point or SPD by a few feet may make dramatic differences in signal strength. Treatment of a group of SPDs as a system and selecting the SPD(s) with the best signal strength to operate as the gateways for the group of SPDs may allow for higher communications quality and/or lower communications power.

In some embodiments, another method to reduce the power consumption of an SPD wireless radio subsystem is to turn the radio on briefly after a period of "off" time, such as once every 10 or 100 seconds. Assuming the "on" time during this period is kept to 10 or a few 10s of milliseconds (or less), this may result in a sufficiently low average power such that even low-cost, readily-available wireless protocol (such as Wi-Fi) chip sets may be used in SPDs with extremely tight power constraints. The ratio of "on" time to "off" time, and the corresponding ratio of "on" power to "off" power, determines the average power consumption of the SPD's communications subsystem. Thus, the "off" time may be chosen to achieve a particular low average power consumption given a minimum "on" time to complete the wireless protocol steps needed to send and/or receive a complete message, the "off" time may be chosen to be appropriately long.

One difficulty with this approach may be in keeping the access point (or other centralized wireless protocol device) from concluding that the remote wireless protocol device (in this case, the SPD) has left the wireless network. If the access point has concluded that the SPD has left the network, and then subsequently the SPD attempts to reestablish communications with the access point, this may require the SPD to go through a complete wireless protocol "rejoin" procedure each time the SPD wanted to have data wirelessly transferred. By convincing the access point that the SPD has been subject to a temporary interference with its transmission signal, the communications may be reestablished without requiring the more involved, time-consuming, and power-consuming "rejoin" procedure. Various schemes known to those skilled in the art may be used to convince the access point that the SPD has not left the wireless network, even if the SPD has not communicated for many seconds.

Some embodiments may have a minimum amount of user input/output (I/O) functionality for setting basic operating parameters. In some embodiments, even this minimum amount of user I/O functionality may be unnecessary for normal operation, and this I/O may be made inaccessible after initial deployment of the device.

In some embodiments, one or more SPDs may include a single-indicator display. A variety of power-saving techniques may be applied to a single-indicator display. These include (but are not limited to):

Applying intermittent power to the indicator at a high-enough frequency such that it appears to be on continuously when viewed by the human eye. This frequency may be in the range of 60 cycles per second or greater.

In concert with intermittently powering the single indicator, adjust the duty cycle of the power circuit for the indicator such that the indicator is powered for substantially less than 100% of each cycle. This technique relies on the human eye's propensity to integrate the light that it receives in such a way that a rapidly-pulsing indicator may appear to be on continuously if the frequency of pulsation is high enough, and also that the eye will tend to overestimate the width of the pulses such that the indicator will appear brighter than the duty cycle may otherwise suggest.

Also in some embodiments, one or more SPDs may include a simple numeric or alpha-numeric display. A variety of power saving techniques, such as those described above, may be used with these types of displays.

In some embodiments, one or more SPDs may include a pixeled display. A variety of power-saving techniques may be applied to pixeled displays. These include (but are not limited to):

Application of sleep modes based on scheduled "night" periods.

Leaving the display in sleep mode until user proximity is automatically detected and/or the user otherwise triggers active operation of the display.

Requiring an explicit user trigger for high-power-drain items such as backlights.

Depending on the application being served by the SPD, numerous forms of sensors may be utilized in an SPD embodiment. Sensors with implications for power management or other unique purposes are described below, but any form of sensor operable within the SPD's power budget, size restrictions, product cost, and/or other constraints may be supported.

In some embodiments, one or more SPDs may include a passive infra-red (PIR) device or some other mechanism to effect proximity detection of personnel. Their application in an SPD embodiment for display of information may alter the behavior of the SPD to minimize power consumption. For example, driving or updating an LCD display consumes power that may be reduced or eliminated by suppressing updates to the display and/or shutting down the display if no one is present to observe the content of the display.

In some embodiments, one or more SPDs may include a photo-detector, since the presence of light may be an indicator of current or pending activity. In one embodiment, to display information, the absence of light may also indicate it may be prudent to enter a power-down state. The SPD may also inform a central monitoring point that insufficient light is present in an area that is intended to be lit for security, safety, aesthetic, or other reasons.

A variety of methods and strategies may be used to reduce power in the controller. Some embodiments of the SPD may use one, many, all, or none of these methods and strategies.

In some embodiments, operating power is reduced during periods of inactivity. Often, the controller's periodic tasks may be arranged such that they are completed in a burst of activity, followed by a period of inactivity, until the periodic tasks again need to be performed. As long as these periods of activity and inactivity are kept relatively short and frequent, it may appear to the rest of the SPD that the controller is performing these tasks continuously, albeit at a slower rate.

In some embodiments, the controller may be designed to "sleep" during the periods of inactivity, and "wake up" in response to some stimulus, change of state, and/or elapsed time. This may be useful when the power consumption of the controller during sleep is lower than when it is awake. The average power consumption for the controller operating in this way may be less than if it were awake all of the time.

Some techniques to reduce power in the controller during periods of inactivity include running the controller's internal circuitry at a lower frequency and/or lower voltage than when it is fully awake, executing fewer instructions per unit time than when it is fully awake, and selectively disabling some or all of the functions within the controller.

In some embodiments, operating power may be reduced during periods of reduced activity. For example, the controller may have several different reduced-power modes of operation, as compared with its full-power, full-operation mode. Often, only a subset of the full capabilities of the controller is needed at any particular time. In this case, some of the functions of the controller may be unused except during specific times, and may be disabled the rest of the time to reduce average power consumption. Additionally, some of the functions within the controller may be needed, but only at a slower operating rate, so operating them at a lower frequency may reduce average power consumption. Continuously adjusting the operating frequency of one or more subsystems to better match the needed performance at any particular time may also reduce the controller's average power consumption. By automatically selecting the appropriate low-power operating mode appropriate for the tasks it needs to perform at any particular period of time, the controller may reduce its average power consumption while still allowing the SPD to operate acceptably well.

In some embodiments, operating power is reduced by running at a lower or lowest voltage. Often, the circuitry that may be used to implement a particular controller embodiment is specified to operate properly over a range of voltages. Typically, the lowest power consumption is achieved at the lowest supply voltage. In some embodiments, the maximum frequency of guaranteed operation is reduced when the supply voltage is reduced, even if the supply voltage remains within the specified operating range. Also, in some embodiments, certain functions of the controller may be guaranteed to operate only at a higher minimum voltage than the minimum voltage required by other functions.

By allowing the operating voltage of the controller to be varied, some embodiments may have the controller select its operating voltage based on the frequency at which it needs to operate and/or which functions it needs to use during any particular period of time. Using this technique, the average power consumption of the controller may be lower than if the controller were to be operated at the highest minimum guaranteed operating voltage of all of its frequencies and functions.

In some embodiments of the SPD, updating the controller's non-volatile program and/or data memory may allow the controller to maintain the contents of its memory after a loss of power. In some cases, these non-volatile memory circuits require a higher operating voltage during update operations than during read operations. Allowing the controller to adjust the operating voltage of the non-volatile memory subsystem, such that it is operated at the higher voltage only during update operations, and operated at the lower voltage during read operations, may reduce the average power consumption of some embodiments of the SPD.

In some embodiments, the total extra power consumption needed in the controller when the higher voltage is used for writing to non-volatile memory circuits may be further reduced by grouping together the non-volatile-memory update operations. The "overhead" time spent raising and lowering the voltage may, therefore, be shared among multiple update operations. This means that for a given set of update operations, the time (and excess power) spent on most of the "overhead" may be eliminated.

A variety of methods may be used to initialize the SPD operating parameters. One method that may be used is through the inclusion of a USB port or similar serial interface for initial configuration and/or initial power charge of the SPD, and to use a laptop or computer that is able to directly operate at the MAC layer of the Wi-Fi protocol to set up the higher layer operations. In many environments where the SPD is operating, the DHCP protocol is often available, so the IP address(es) may be obtained automatically. In environments where the DHCP protocol is not available or is otherwise inappropriate to be used, the IP address(es) and other relevant operating parameters may be allocated manually.

Some embodiments include a button on the back of the SPD that invokes the display of the IP address momentarily. With the IP address known, a configuration utility downloadable from a web site or other convenient location may be used to configure the operating behaviors of the SPD. Alternatively, for embodiments in which the SPD includes touchscreen capability, triggering a configuration mode may lead to a series of menu queries that may adequately drive initial configurations.

For some of SPD applications, compromise of the host network by the SPD is typically not possible due to the limited network interface power budget and/or lack of standard higher-layer protocols that will be present on the device. For example, in many SPD embodiments, there will not typically be support for TCP operations. The SPD functional behaviors, therefore, will be governed by an entirely proprietary message set. In some embodiments, however, passwords and/or other means may be used to limit access to the SPD to authorized personnel and/or designated remote device(s).

The controller in the SPD may maintain the physical and logical address of the SPD. A default set of these addresses may be pre-programmed when the SPD is manufactured. If necessary, some or all of these addresses may be set or changed when the SPD is initially deployed and/or changed while the SPD is operational.

In the event that the SPD is deployed in a network that does not broadcast its security information, the network interface access codes will need to be entered as part of the initial configuration of the SPD.

The issues of privacy and encryption are of concern when there is a need for protection of information communicated across an open network interface. This need may be addressed in a number of ways with respect to SPD communications with a remote device, including:

Information communicated across the external computer network may be sent in a proprietary format, minimizing the risk of casual observance through the use of a network "sniffer" or similar device.

Standard encryption techniques may be applied to communications across the external computer network, for even more robust privacy and protection against unauthorized observation.

In embodiments that include communication with the remote device(s), this communication typically takes place through the external computer network. Some embodiments of the SPD may contain one or more network interfaces that implement a wireless communications protocol. The wireless protocol may be a standard, commonly-deployed technology, such as "Wi-Fi" (IEEE 802.11a, IEEE 802.11b, IEEE 802.11g, etc.), or the protocol may be a specialized one particularly tailored to the low-power, transmission distance, and/or other needs of the SPD and/or its application. Combinations of different network interface types are also possible, allowing for gateway operations where applicable.

Regardless of the type of wireless protocol, one (or more) devices in the external computer network typically provide the wireless connection to the overall external computer network. Whether the external computer network is inherently wireless or a hybrid of wired and wireless networking technologies, the device that operates as the intermediary to provide the connection is often referred to as a wireless access point. In some cases, the wireless access point may be built into a node on the network, and/or may be part of one or more remote device(s). In some cases, the wireless access point may be a device dedicated to bridging the wireless network to a wired network. In some cases, the remote device may use a built-in wireless interface to directly communicate to the SPD (in Wi-Fi nomenclature, this is known as "ad-hoc" operation mode).

The wireless access point used by the SPD may be a standard commercially-available device that is typically used with other standard wireless products, or the access point may be a specialized device whose wireless port may be used only with the SPD. The access point may be configured to support one or more SPDs, one or more other commercially-available wireless products, or any combination of these. In most cases, the function of the access point for the SPD may be to convert the wireless messages from the SPD to the wired networking protocol used by the external computer network, and vice-versa.

A role of the external computer network when used with the SPD is typically to transfer messages from the SPD to the remote device(s) and vice-versa. In many cases, it is expected that standard, already-installed computer networks may be used for this function. Therefore, the SPD may typically be operated such that its messages may be easily converted by the existing wireless access point(s) for carriage across the computer network.

Typically, the SPD does not require any protocol changes in the wired part of the external computer network, and in some cases, requires no special protocol changes for the wireless portion either. SPD messages may therefore be constructed, formatted, and addressed for easy transport across the external computer network to the remote device(s), and vice-versa.

In cases where proprietary communication methods are used between SPDs, a gateway function may exist either among the SPDs or in a special-purpose device co-located with the SPDs but connected into the external computer network via a standards-oriented wired or wireless means.

Once the network connectivity has been established between the SPD and the remote device(s), they may typically communicate with each other using the standard messaging format and protocol(s) used in the external computer network. Each SPD may have a unique network address, or other means to be addressed uniquely, and likewise, each remote device may have a unique network address, or a means to be addressed uniquely. Properly-addressed messages may be sent across the external computer network by both the SPD(s) and the remote device(s) using the existing networking mechanisms.

In some SPD applications, the software agent(s) running on the remote device(s) may be used to communicate with the SPD through the external computer network. In some embodiments, the communication may be automatic, with each interaction triggered by some change of status in the remote device, the SPD, or both. In some embodiments, the communication may be manually initiated by a user of the remote device, such as to change the configuration or other state of the SPD. In some embodiments, both initiation modes may be supported.

Note that in some embodiments, the user directly interacts with the remote device(s), such as with a keyboard and/or mouse and/or display/monitor. In some embodiments, the user interacts indirectly with the remote device(s), such as across a computer network and/or additional communications link.

In some embodiments, communication is automatically initiated by the remote device. Some examples of uses of automatic communication initiated by the remote device may include:

- The SPD displays a subset of database information: a software agent running on the remote device periodically searches a database resident in the remote device and/or in a computer reachable through the external computer network. The results of the search, possibly along with other relevant information, are formatted by the software agent and are sent to the SPD, especially when those results have changed since the previous update.
- The SPD displays meeting room information: a software agent running on the remote device monitors the reservations for the meeting room to which the SPD is attached. The software agent may periodically interrogate the networked calendar and/or reservation system (such as Microsoft Outlook, IBM/Lotus Notes, etc.) and send the reservation information, possibly along with other relevant information, to the SPD for display. This application may be useful for general businesses, as well as businesses making rooms available to third parties, such as hotels, convention centers, etc.
- The SPD displays examination room information in a hospital or doctor's office. A software agent running on the remote device monitors the patient reservations for the room to which the SPD is attached. The information may allow the medical personnel to know who is in the room without having to enter the room and disturb the patient, and without having to find the reservation clerk and ask him/her about the status of the room.
- The SPD displays news, advertising, and/or market information: a software agent running on the remote device gathers various news, advertising, stock quotes, headlines, or other relevant information from internal and/or external sources (such as from the Internet). The software agent may format the information and periodically sends the formatted information to the SPD for display.
- The SPD displays pricing or other product status information: the SPD (or a set of SPDs) may be positioned adjacent to its (their) corresponding retail product(s). Each SPD may be used to display up-to-date pricing and/or other product status information in a supermarket, retail store, warehouse, or other locations. The software agent running on the remote device may gather data to be displayed on each SPD from a database or other computer system, and/or from direct user input at the remote device.
- The SPD is used as a personal display for each employee/user/customer: an SPD may be attached to each employee's cubicle or office, and may be used to display personal information, such as where the employee is presently, if the employee is on vacation, if the employee is available for drop-in conferences, or other employee circumstances. The employee may update the display by sending messages through the software agent running on the remote device, and this information may be sent to the SPD, possibly along with other relevant information, such as scheduling derived from other sources.
- The SPD displays room status information: an SPD may be placed in a room used by many people, such as an area with several cubicles, a ball room, an auditorium, or other locations. The software agent running on the remote device may gather any messages relevant to that room, such as general notices, announcements, or other messages, and may merge that with relevant local data, such as time, date, the current temperature in the room, and may send the formatted information to the SPD for display.

The SPD is used as an annunciator: the SPD may be used to display important real-time information needed by people in the room where the SPD is located. For example, in a technical support or telephone call-center application, the SPD may display the average wait for customers on hold, the number of customers presently being served, whether the wait time is increasing, or other relevant information. The software agent running on the remote device may collect real-time information from the telephone switch and combine that information with other relevant information, such as time of day, recent history, or up time, to generate formatted data to send to the SPD for display.

The SPD is used as an actuator: the SPD may contain one or more motors, actuators, electrical contacts, or other similar components which may be used to move or position some external mechanical or electrical apparatus. The SPD may receive a message from the remote device requesting that the mechanical or electrical apparatus be moved, repositioned, turned on, turned off, or otherwise adjusted. Alternatively, the SPD may receive a message requesting the status of the mechanical or electrical apparatus, and the SPD may respond with a message reporting that status.

In some embodiments, communication is automatically initiated by the SPD. Some examples of uses of automatic communication initiated by the SPD may include:

The SPD used as a security sensor: the SPD may contains sensors to detect various environmental states, such as temperature, humidity, lighting, motion, vibration, noise, shock, pressure, or other environmental states. For example, in a security application, a small SPD may be attached to a window and used to detect if the window has been opened or broken. If such a stimulus is detected, the SPD may send a message to the remote device for further processing. The SPD may also send non-urgent messages periodically to confirm its continued correct operation and/or that the communication link is still functional.

SPD reports its own health status: the SPD may send messages to the remote device to indicate that the SPD continues to operate correctly and/or the communication link is still intact. When the SPD detects an internal problem, such as insufficient input power and/or internal energy storage to continue operation, the SPD may send a message to the remote device to request maintenance service or other appropriate action. When the remote device does not receive a periodic health status message from the SPD, the remote device may conclude that the communications link and/or the SPD have failed, and the remote device may then take an appropriate action.

SPD used as a HVAC sensor: the SPD may be used in a heating/ventilation/air-conditioning application, and may sense temperature, humidity, lighting, or other environmental states. The information may be sent to the remote device for further processing with data from other sensors, and the state of the HVAC system may then be sent to the SPD for display, along with current time, date, local temperature, or other relevant information.

SPD used as an intercom: the SPD may contain a microphone and speaker, and perhaps "doorbell" and "talk" buttons. The SPD may send a message to the remote device when the "doorbell" button is pushed, and may digitize/decode voice signals for use with the internal microphone and speaker. The digitized voice data may be sent to and from the remote device, or another computer interconnected with the external computer network.

The software agent (SA) running on the remote device(s) may perform a variety of tasks, depending upon the embodiment(s) of the SPD(s) with which it communicates and the intended functionality of the SA and its embodiment(s). SA embodiments typically contain combinations of subprograms which each perform a specific task or set of tasks. For example, some subprograms may be responsible for reading information from a database, while other subprograms write to a database. Some subprograms may perform both tasks. SAs that contain both readers and writers may have complex interactions with their corresponding database(s), as well as when communicating with the associated SPD(s).

An example SA application and associated environments that may be used with SPD(s) are described below. Actual embodiments of SAs may implement one, some, all, or none of the following examples.

In an exemplary embodiment, the SA may implement a calendar. This application allows an SPD (or set of SPDs) to be used for resource management, such as for reservation management of a conference room. The SPD(s) used for this application may typically contain a display of some sort that may show resource scheduling information. The SPD(s) may communicate with the remote device(s) running the calendar SA(s), and the calendar SA(s) may typically interact with a separate calendar management program/database, such as Microsoft Outlook or IBM Lotus Notes. Through the interaction with the separate calendar management program/database, the SA(s) may gather the necessary data to send to the SPD(s) for appropriate display of scheduling information, and/or gather the necessary data from the SPD(s) to appropriately update the separate calendar management program/database.

The calendar application may be implemented in a variety of environments. Exemplary environments include small offices using off-site hosted MS-Exchange services, small offices using off-site hosted World Wide Web Distributed Authoring and Versioning or WebDAV services (a set of extensions to the Hypertext Transfer Protocol (HTTP) that allows users to collaboratively edit and manage files on remote web servers), medium-to-large offices using MS-Exchange, and medium-to-large offices using local WebDAV.

Figure 9A:
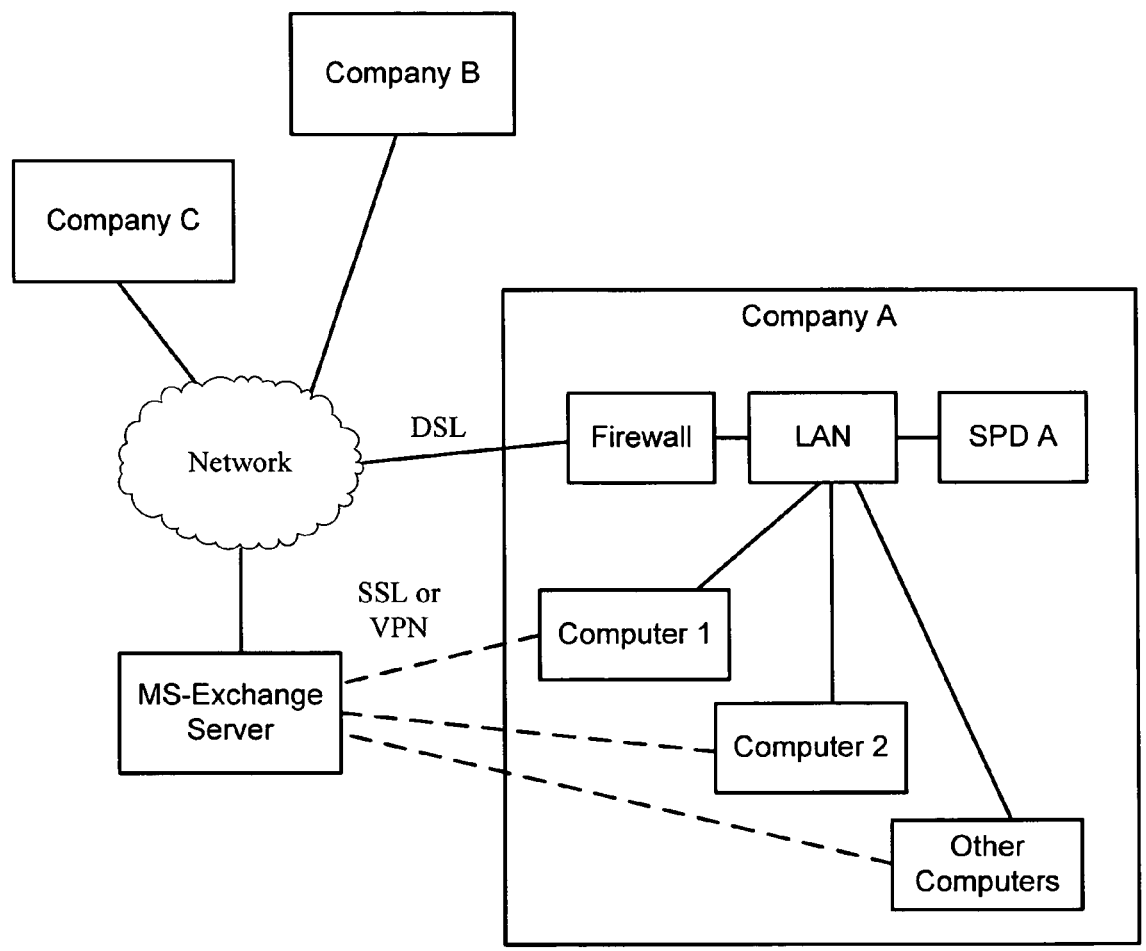
FIG. 9A is a block diagram illustrating a computer network having an MS-Exchange server.

For small offices using off-site hosted MS-Exchange, FIG. 9A illustrates an expected environment for a small office using a hosted MS-Exchange server for their mail services. In this example, company A may have 3 conference rooms, and computer 2 may be an administrative computer that is running Outlook and the SPD A Software Agenet (SA). Note that in this example, multiple companies share a single MS-Exchange server, accessing the server via their internet connection, such as over SSL or VPN connections through a firewall. Routers, hubs, etc. are assumed to be in the LAN cloud but are omitted for clarity.

The configuration illustrated in FIG. 9A poses several challenges:

Installation/operational simplicity: Small offices often operate with little to no information technology staff available for applications training, management or installation.

Exchange server modification avoidance: hosting companies providing MS-Exchange services often resist extensions to shared server platforms.

Additional outlook license avoidance: MS-Outlook seat license costs are often high for small offices. As a consequence, they typically have less volume discount and purchasing leverage.

Minimizing communications hops: Offsite hosting often creates large, variable latencies in communications to the MS-Exchange server.

A variety of software architectures may be used to address these challenges. These are described below.

In some embodiments, installation and operational simplicity are linked as an issue but may be accomplished in several only somewhat-related ways as follows:

Software Agents (SAs) may be designed to be installed only on client workstations. In this way, access to a server machine by an SPD administrator may not be necessary.

Two software elements may be used to fulfill the SA behaviors in each of two client workstations: one is an Outlook VBA extension (a version of Visual Basic that is embedded in Outlook) and the other is a separate supporting service.

Both software elements may be installed in the same process. As a consequence, decisions about which is needed under what conditions may not be necessary.

Delegation may be "hooked" so that the notification of delegate status for a resource managed with an SPD may be provided to the (potentially new) delegate with the option of installing the necessary components to manage the resource.

Standard Outlook resource management may be used for creation and management (i.e. delegation) of the resource as a mailbox. This may allow meeting organizers, even for those individuals who are not administrators of the rooms, to use the source when scheduling meetings.

Standard Outlook resource management may be used to avoid data collisions or conflicts in accepting resource booking requests.

Installation of VBA elements may be largely invisible. To all appearances there may be an additional tool available to manage the SPDs and client software but otherwise it is just standard Outlook for handling the resource.

The supporting service may be "fed" information by the Outlook VBA extension in the background on an event-driven basis. This may provide display updates to the SPD, such that no user intervention may be necessary.

The supporting service may be a member of a cooperating group of services running on the machines of all resources owners and delegates. SPD communication may be performed only by the currently elected master whose role may be constantly negotiated behind the scenes without administrator input.

In some embodiments, utilization of the Outlook VBA mechanism and a local high-priority software service may allow scheduling and creation of resources without changes to the MS-Exchange server.

In some embodiments, utilization of the Outlook VBA mechanism and the creation of the resources as a resource mailbox may avoid any need for an additional Outlook license.

In some embodiments, utilizing the locally-located workstation of the administrator(s) reduces the latency and communications delays to a best case path over the LAN versus the uncertain path to the MS-Exchange server, thereby minimizing communication hops.

Figure 9B:
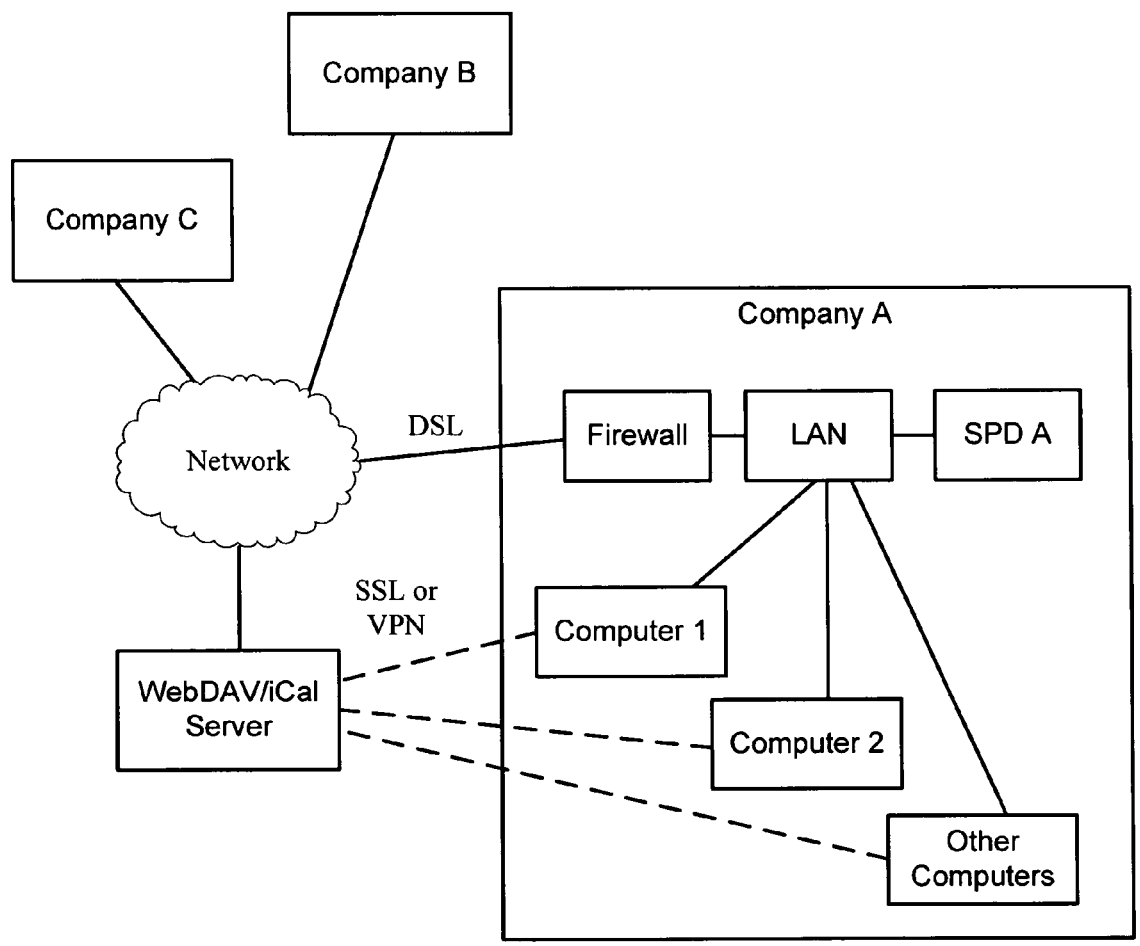
FIG. 9B is a block diagram illustrating a computer network having a web DAV/iCal server.

For small offices using off-site hosted WebDAV, FIG. 9B illustrates an environment for a small office using an offsite hosted iCalendar (a calendar application developed by Apple Computer). In this example, company A may have 3 conference rooms, and computers 1 and 2 may be running the SPD management utilities and Software Agent (SA). Note that the server is accessed via an Internet connection, such as over SSL or VPN connections through a firewall. Routers, hubs, etc. are assumed in the LAN bubble above but are omitted for clarity.

The configuration illustrated in FIG. 9B poses several challenges:

Installation/operational simplicity: Small offices often operate with little to no information technology staff available for applications training, management or installation.

The generic nature of WebDAV/iCal services: No calendar behaviors really exist within a WebDAV/iCal service. Instead, the application provides a web-based transactional-based information storage service on which a group calendaring system may be built.

Minimizing communications hops: Offsite hosting creates large, variable latencies during communication with the WebDAV server.

A variety of software architectures may be used to address these challenges. These are described below.

In some embodiments, installation and operational simplicity are linked as an issue but are accomplished in several only somewhat related ways as follows:

Installation of software may be limited to client workstations such that no administrator access to any form of server machine is necessary.

Two software elements may be used to fulfill the SA behaviors in each of two client workstations. One of these may be an SPD management utility to fulfill the same purpose as the Outlook VBA application. The other may be a separate supporting service.

Both software elements may be installed in the same process. In this way, no decisions regarding which one is needed under what conditions may be necessary.

Delegation may be handled using an email notification that indicates the delegation status for the resource to be managed. An attached executable file, which is generated and pre-configured for the WebDAV options necessary, may be optionally installed to install the components necessary to manage the resource.

Figure 9C:
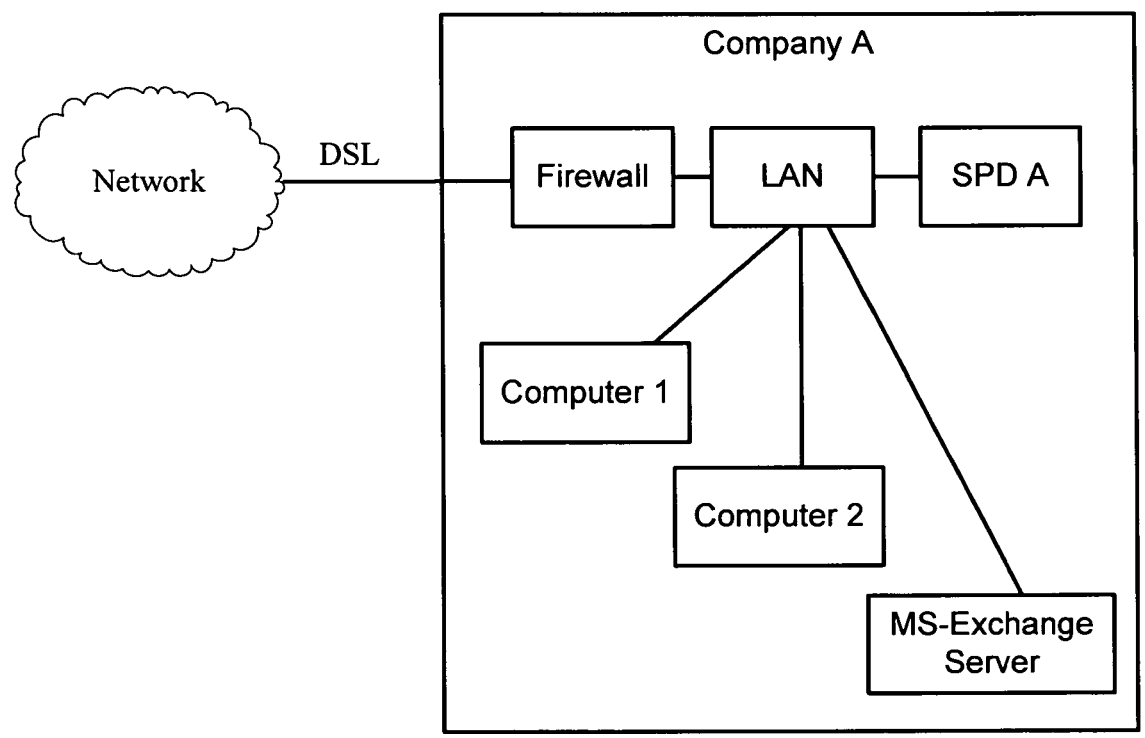
FIG. 9C is a block diagram illustrating a computer network having an MS-Exchange server.

For medium-to-large offices using MS Exchange, FIG. 9C illustrates a local MS-Exchange server for their mail services. In this example, Company A may have 3 conference rooms, and computers 1 and 2 may be running Outlook and the SPD Software Agent (SA). Note the more direct connections between the system components. Once again, routers, hubs, etc are assumed in the LAN bubble above but are omitted for clarity.

Figure 9D:
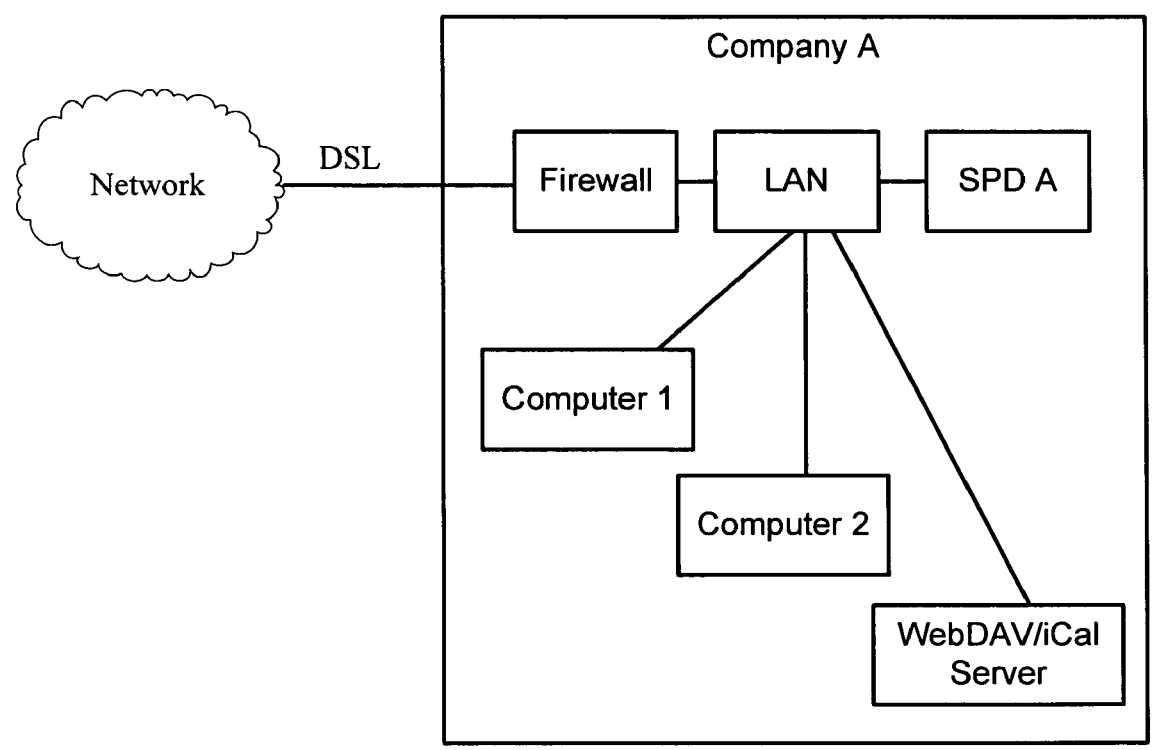
FIG. 9D is a block diagram illustrating another computer network.

For medium-to-large offices using off-site hosted WebDAV, FIG. 9D illustrates a local WebDAV server for iCalendar services. In this example, company A may have 3 conference rooms, and computers 1 and 2 may be running SPD management utilities and Software Agent (SA). Note the more direct connections between the system components. Once again, routers, hubs, etc are assumed in the LAN bubble above but are omitted for clarity.

In other embodiments (not shown), the SPDs may be used in systems that implement or use Microsoft Outlook and/or Lotus Notes (an application offered by IBM).

While the foregoing description and drawings represent the preferred embodiments of the present invention(s), it will be understood that various additions, modifications and substitutions may be made therein without departing from the spirit and scope of the present invention(s) as defined in the accompanying claims. In particular, it will be clear to those skilled in the art that the present invention(s) may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention(s) being indicated by the appended claims, and not limited to the foregoing description.

What is claimed is:

1. A self-powered device configured to selectively communicate with a remote computing device, the self-powered device comprising:
   a power circuit electrically coupled to a bus;
   a processor electrically coupled to the bus;
   a memory electrically coupled to the bus, said memory comprising:
      instructions for selecting one of a plurality of modes of operation, wherein the plurality of modes of operation include a first mode of operation in which the self-powered device consumes less than a pre-determined or adaptively-determined amount of power and a second mode of operation in which self-powered device consumes more than the pre-determined or adaptively-determined amount of power;
      instructions for conserving power by alternating between the first mode of operation and the second mode of operation, such that the self-powered device is in the second mode of operation during pre-determined or adaptively-determined time intervals, and wherein a duty-cycle of the second mode of operation relative to the first mode of operation is in accordance with a power budget for the self-powered device; and
      instructions for communicating with the computing device only during the second mode of operation.

2. The self-powered device of claim 1, wherein the self-powered device further comprising transmit circuits and receive circuits, wherein the computing device and the self-powered device are time synchronized such that the transmit and receive circuits are powered only during one or more of the time intervals.

3. The self-powered device of claim 2, wherein the time synchronization is based on a Network Time Protocol.

4. The self-powered device of claim 2, wherein the time synchronization is based on a periodic beacon signal.

5. The self-powered device of claim 1, wherein the computing device polls the self-powered device only during one or more of the time intervals.

6. The self-powered device of claim 1, wherein the self-powered device switches to the second mode of operation prior to one or more of the time intervals, and wherein the self-powered device switches to the first mode of operation after one or more of the time intervals.

7. The self-powered device of claim 1, wherein the self-powered device further includes instructions for determining a periodicity of the time intervals in accordance with signals provided by the computing device, and wherein the duty-cycle is based on the periodicity.

8. The self-powered device of claim 1, wherein the self-powered device further includes instructions for combining messages that are to be communicated to reduce communication overhead or reduce energy consumption.

9. The self-powered device of claim 1, wherein the self-powered device lowers the operating voltage of one or more of its subsystems when in the first mode of operation.

10. The self-powered device of claim 1, wherein the self-powered device transmits a foreshortened message to the computing device, wherein the message is long enough to maintain the connection with the computing device.

11. The self-powered device of claim 1, wherein the self-powered device further comprising coordination instructions for assigning communication priorities to the self-powered device and to one or more additional self-powered devices in accordance with power budgets for these devices.

12. The self-powered device of claim 1, wherein the computing device further includes instructions for providing an acknowledgement message to a sending self-powered device with a higher priority or more quickly than other types of messages.

13. The self-powered device of claim 1, wherein the power circuit is configured to convert an external energy source into a power signal that powers the self-powered device, where the external energy source is selected from a group consisting of: a thermal energy source, a light energy source, an electromagnetic energy source, a wind energy source, a wave energy source, a kinetic energy source, a magnetic energy source, a chemical energy source, and any combination of the aforementioned sources.

14. The self-powered device of claim 1, wherein the power circuit includes a component selected from the group consisting of a photovoltaic cell, a wind energy generator, a thermoelectric energy generator, an electromagnetic energy generator, a kinetic energy generator, a piezoelectric device, a magnetic energy generator, and a chemical-to-electricity generator, and any combination of the aforementioned components.

15. The self-powered device of claim 1, wherein the memory further comprises instructions for being controlled by the computing device.

16. The self-powered device of claim 1, further comprising one or more sensors.

17. The self-powered device of claim 16, wherein the one or more sensors measure a characteristic selected from the group consisting of temperature, humidity, pressure, vibration, light, motion, sound, proximity, flow rate, electrical voltage, and electrical current.

18. The self-powered device of claim 1, wherein the self-powered device provides configuration information to a component in accordance with a measured characteristic, the self-powered device's internal status, any received message, elapsed time, local or remote user interaction, a local automatic process, or a remote automatic process.

19. The self-powered device of claim 18, wherein the component is selected from the group consisting of a switch, a relay, an electromechanical actuator, a heater, a fan, a speaker, a solenoid, a motor, an electric field generator, a magnetic field generator, and an electro-magnetic field generator.

20. The self-powered device of claim 1, wherein the self-powered device provides an indication in proportion to output of the circuit powering the self-powered device.

21. The self-powered device of claim 1, wherein the device provides an indication in proportion to the communication signal between the self-powered device and the computing device or another self-powered device.

22. A networked system, comprising:
a computing device;
a self-powered device configured to selectively communicate with the computing device, the self-powered device comprising:
a power circuit configured to convert an external energy source into a power signal that powers the self-powered device;
a processor electrically coupled to the power circuit;
a memory containing:
instructions for selecting one of a plurality of modes of operation, wherein the plurality of modes of operation include a first mode of operation in which the self-powered device consumes less than a pre-determined or adaptively-determined amount of power and a second mode of operation in which self-powered device consumes more than the pre-determined or adaptively-determined amount of power;
instructions for conserving power by alternating between the first mode of operation and the second mode of operation, such that the self-powered device is in the second mode of operation during pre-determined or adaptively-determined time intervals, and wherein a duty-cycle of the second mode of operation relative to the first mode of operation is in accordance with a power budget for the self-powered device; and
instructions for communicating with the computing device only during the second mode of operation.

23. The system of claim 22, further comprising one or more additional self-powered devices, wherein each self-powered device has a transceiver to communicate with one or more of the other self-powered devices, wherein only the self-powered device has a transceiver capable of communicating with the computing device, and wherein communication destined for the computing device is relayed through the self-powered device.

24. The system of claim 23, wherein paths of the communications destined for the computing device are optimized in accordance with the power budgets of all of the self-powered devices.

25. The system of claim 24, wherein the transceiver duty cycle, transmit power, receive sensitivity, and/or power consumption of the self-powered device is optimized based on the paths of the communications destined for the computing device.

26. A self-powered device configured to selectively communicate with a remote computing device, the self-powered device comprising:
a means for converting an external energy source into a power signal for powering the self-powered device;
a means for processing data;
a means for storing data comprising:
instructions for selecting one of a plurality of modes of operation, wherein the plurality of modes of operation include a first mode of operation in which the self-powered device consumes less than a pre-determined or adaptively-determined amount of power and a second mode of operation in which self-powered device consumes more than the pre-determined or adaptively-determined amount of power;
instructions for conserving power by alternating between the first mode of operation and the second mode of operation, such that the self-powered device is in the second mode of operation during pre-determined or adaptively-determined time intervals, and wherein a duty-cycle of the second mode of operation relative to the first mode of operation is in accordance with a power budget for the self-powered device; and
instructions for communicating with the computing device only during the second mode of operation.

* * * * *